United States Patent
Gruhlke et al.

(10) Patent No.: US 9,019,240 B2
(45) Date of Patent: Apr. 28, 2015

(54) OPTICAL TOUCH DEVICE WITH PIXILATED LIGHT-TURNING FEATURES

(75) Inventors: Russell Wayne Gruhlke, Milpitas, CA (US); Ye Yin, Santa Clara, CA (US); Lai Wang, Milpitas, CA (US); David William Burns, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 489 days.

(21) Appl. No.: 13/307,353

(22) Filed: Nov. 30, 2011

(65) Prior Publication Data

US 2013/0082980 A1    Apr. 4, 2013

Related U.S. Application Data

(60) Provisional application No. 61/541,014, filed on Sep. 29, 2011.

(51) Int. Cl.
*G06F 3/042* (2006.01)
*G02F 1/1333* (2006.01)
(Continued)

(52) U.S. Cl.
CPC .......... *G02F 1/13338* (2013.01); *G06F 3/0421* (2013.01); *G02B 6/0053* (2013.01); *G02B 26/001* (2013.01); *G02B 26/08* (2013.01); *G02B 6/0011* (2013.01); *G06F 3/0428* (2013.01)

(58) Field of Classification Search
CPC ...... G06F 3/042; G06F 3/0421; G06F 3/0428
USPC .................................. 345/175; 362/600–629
See application file for complete search history.

(56) References Cited

U.S. PATENT DOCUMENTS 6,040,937 A    3/2000  Miles
6,478,432 B1   11/2002 Dyner
(Continued)

FOREIGN PATENT DOCUMENTS

GB    2 340 281    2/2000
JP    03 046724    2/1991
(Continued)

OTHER PUBLICATIONS

Written Opinion of the International Preliminary Examining Authority—PCT/US2012/056925—ISA/EPO—Oct. 11, 2013.
(Continued)

*Primary Examiner* — Latanya Bibbins
(74) *Attorney, Agent, or Firm* — Knobbe, Martens, Olson & Bear, LLP

(57) ABSTRACT

This disclosure provides systems, methods and apparatus for a touch screens configured to determine a position of a touch event by selectively redirecting light to correlated locations on a light sensor. In one aspect, the touch screen apparatus can include a light guide forming a touch interface, a light source for injecting light into the light guide, a light sensor for detecting the injected light, and a pixilated light-turning layer. The pixilated light-turning layer can include a plurality of light-turning features forming pixels. The pixels can receive incident light corresponding to the emitted light scattered by an object contacting the light guide. The pixels can redirect the incident scattered light towards the light sensor such that light selectively propagates to one or more correlated light receiving locations. A processor can map the light receiving location to an area contacted by the object, thereby determining a position of a touch event.

5 Claims, 15 Drawing Sheets

(51) Int. Cl.
*G02B 26/00* (2006.01)
*G02B 26/08* (2006.01)
*F21V 8/00* (2006.01)

(56) References Cited

U.S. PATENT DOCUMENTS

| | | |
|---|---|---|
| 6,594,023 B1 | 7/2003 | Omura et al. |
| 6,603,520 B2 | 8/2003 | Umemoto |
| 6,631,998 B2 | 10/2003 | Egawa et al. |
| 6,652,109 B2 | 11/2003 | Nakamura |
| 6,674,562 B1 | 1/2004 | Miles |
| 7,025,461 B2 | 4/2006 | Veligdan |
| 7,054,045 B2 | 5/2006 | McPheters |
| 7,123,216 B1 | 10/2006 | Miles |
| 7,327,510 B2 | 2/2008 | Cummings et al. |
| 7,403,180 B1 | 7/2008 | Silverstein et al. |
| 8,203,540 B2 * | 6/2012 | Cernasov .................. 345/175 |
| 2002/0067348 A1 | 6/2002 | Masters et al. |
| 2003/0001825 A1 | 1/2003 | Omura et al. |
| 2004/0140961 A1* | 7/2004 | Cok .................. 345/175 |
| 2004/0188599 A1 | 9/2004 | Viktorovitch |
| 2005/0128190 A1 | 6/2005 | Ryynanen |
| 2005/0156914 A1 | 7/2005 | Lipman et al. |
| 2006/0001653 A1 | 1/2006 | Smits |
| 2006/0227099 A1 | 10/2006 | Han et al. |
| 2006/0290684 A1 | 12/2006 | Giraldo et al. |
| 2007/0176908 A1 | 8/2007 | Lipman et al. |
| 2008/0007541 A1* | 1/2008 | Eliasson et al. .................. 345/176 |
| 2008/0221814 A1 | 9/2008 | Trainer |
| 2009/0113348 A1 | 4/2009 | Fein et al. |
| 2009/0225395 A1 | 9/2009 | Ganti et al. |
| 2009/0237763 A1 | 9/2009 | Kramer et al. |
| 2009/0257108 A1 * | 10/2009 | Gruhlke et al. .................. 359/290 |
| 2010/0187422 A1* | 7/2010 | Kothari et al. .................. 250/353 |
| 2010/0321339 A1 | 12/2010 | Kimmel |
| 2011/0025620 A1 | 2/2011 | Jakobsen et al. |
| 2011/0032214 A1 | 2/2011 | Gruhlke et al. |
| 2011/0122071 A1 | 5/2011 | Powell |
| 2011/0157097 A1* | 6/2011 | Hamada et al. .................. 345/175 |
| 2011/0248958 A1 | 10/2011 | Gruhlke |
| 2011/0248960 A1 | 10/2011 | Gruhlke |

FOREIGN PATENT DOCUMENTS

| | | |
|---|---|---|
| JP | 03 217925 | 9/1991 |
| JP | 11 211999 | 8/1999 |
| WO | WO 00/50807 | 8/2000 |
| WO | WO 2005/026938 A2 | 3/2005 |
| WO | WO 2005/029395 | 3/2005 |
| WO | WO 2005/094176 | 10/2005 |
| WO | WO 2008/045364 | 4/2008 |
| WO | WO 2009/086836 | 7/2009 |
| WO | WO 2010/073047 | 7/2010 |
| WO | WO 2010/141388 | 12/2010 |

OTHER PUBLICATIONS

International Preliminary Report on Patentability—PCT/US2012/056925—ISA/EPO—Feb. 14, 2014.

Huang et al. "Virtual Touch 3D Interactive System for Auto-Stereoscopic Display with Embedded Optical Sensor," Proc. of SPIE vol. 8403, 2011, pp. 18.

International Search Report and Written Opinion in International Application No. PCT/US2012/056925 dated Jan. 2, 2013 in 11 pages.

* cited by examiner

|  | Common Voltages | | | | |
|---|---|---|---|---|---|
| Segment Voltages | $VC_{ADD\_H}$ | $VC_{HOLD\_H}$ | $VC_{REL}$ | $VC_{HOLD\_L}$ | $VC_{ADD\_L}$ |
| $VS_H$ | Stable | Stable | Relax | Stable | Actuate |
| $VS_L$ | Actuate | Stable | Relax | Stable | Stable |

OPTICAL TOUCH DEVICE WITH PIXILATED LIGHT-TURNING FEATURES

TECHNICAL FIELD

This disclosure relates to user interface devices, and more particularly, to touch screen apparatus.

DESCRIPTION OF THE RELATED TECHNOLOGY

Electromechanical systems include devices having electrical and mechanical elements, actuators, transducers, sensors, optical components (e.g., mirrors) and electronics. Electromechanical systems can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of electromechanical systems device is called an interferometric modulator (IMOD). As used herein, the term interferometric modulator or interferometric light modulator refers to a device that selectively absorbs and/or reflects light using the principles of optical interference. In some implementations, an interferometric modulator may include a pair of conductive plates, one or both of which may be transparent and/or reflective, wholly or in part, and capable of relative motion upon application of an appropriate electrical signal. In an implementation, one plate may include a stationary layer deposited on a substrate and the other plate may include a reflective membrane separated from the stationary layer by an air gap. The position of one plate in relation to another can change the optical interference of light incident on the interferometric modulator. Interferometric modulator devices have a wide range of applications, and are anticipated to be used in improving existing products and creating new products, especially those with display capabilities.

Many display systems include user interfaces having an input component. The input component can include a screen with a contact sensing mechanism configured to facilitate determination of a location where contact with the screen is made. This contact with the screen can be made by objects such as a fingertip, pen, or a stylus. To meet market demands and design criteria for devices with contact sensing, new input components are continually being developed.

SUMMARY

The systems, methods and devices of the disclosure each have several innovative aspects, no single one of which is solely responsible for the desirable attributes disclosed herein.

One innovative aspect of the subject matter described in this disclosure can be implemented in a touch screen apparatus that includes a light guide, a light source, a light sensor, and a pixilated light-turning layer. The light guide has a major surface defining a touch input surface of the touch screen apparatus. The light source is configured to inject light into the light guide. The light sensor has a plurality of light receiving locations. The pixilated light-turning layer includes a plurality of light-turning features forming pixels. Each of the pixels is configured to selectively redirect scattered light from the light source to one or more correlated light receiving locations of the light sensor. The scattered light can correspond to light emitted by the light source that is scattered by an object upon the object contacting the major surface.

The apparatus can also include a processor configured to correlate a light receiving location receiving scattered light with a discrete area of the major surface contacted by the object. In some implementations, each discrete area on the major surface can directly overlie one or more of the pixels and each of the one or more of the pixels can be configured to redirect scattered light to a matching one of the one or more correlated light receiving locations. In some implementations, the plurality of light receiving locations can have a one-to-one correlation with the pixels. In some implementations, the pixilated light-turning layer can be a holographic layer, in which the light-turning features form holographic pixels.

The light guide can be disposed above the pixilated light-turning layer and the apparatus can include a second light guide below the pixilated light-turning layer that is configured to propagate light from the pixilated light-turning layer towards the light receiving locations of the light sensor. In some of these implementations, the apparatus can also include an optical decoupling layer between the light guide and the pixilated light-turning layer.

The light source can include a first plurality of light emitters configured to sequentially emit collimated light into a first edge of the light guide, in which the light sensor is disposed on a second edge of the light guide that is disposed on an axis transverse to the first edge. In some of these implementations, the apparatus can also include a second plurality of light emitters configured to emit light into a third edge of the light guide and another light sensor disposed on a fourth edge of the light guide that is disposed on an axis crossing the third edge.

Another innovative aspect of the subject matter described in this disclosure can be implemented in an apparatus that includes a light guide having a major surface for receiving a touch input, a light source for injecting light into the light guide, a light sensor, and a light turning means. The light sensor has a light receiving surface having a plurality of light receiving locations. The light-turning means redirects light injected into the light guide and scattered by an object contacting the major surface such that each of the plurality of light receiving locations selectively receives the scattered light substantially only from an area of the major surface correlated with the each of the plurality of light receiving locations.

The light-turning means can include a plurality of light-turning features forming pixels. Each of these pixels can be configured to selectively redirect light to a correlated light receiving location. In some implementations, the light-turning features can be diffractive light-turning features. The light-turning means can be a holographic layer.

The apparatus can also include a processor configured to correlate a location of light striking the light receiving surface with the area of the major surface contacted by the object.

The light source can include a plurality of light emitters configured to sequentially emit collimated light into the light guide. The sensor can be configured to detect light from the plurality of light emitters. In some implementations, the apparatus can include a processor configured to determine a coordinate corresponding to one axis of the major surface based on which light source of the plurality of light emitters injected the light into the light guide.

The light guide can be disposed above the light-turning means and the apparatus can also include another light guide below the light-turning means and the light guide. The other light guide can be configured to propagate light from the pixilated light-turning layer towards the light sensor. In some of these implementations, the apparatus can include an optical decoupling layer between the light guide and the light-turning means.

Another innovative aspect of the subject matter described in this disclosure can be implemented in a method of detecting at least one touch event on a touch screen. The method includes receiving light directed from a pixilated light-turning layer at a light sensor location on a light sensor, the pixilated light-turning layer including pixels configured to redirect at least a portion of incident light scattered by an object above a light guide to the light sensor location. The method also includes mapping the light sensor location receiving the incident light with a location of the object. The light sensor location is correlated with at least one single pixel of the pixilated light-turning layer. In addition, the method includes determining a position of a touch event based on the mapping.

The locations on a light receiving surface of the light sensor can have a one-to-one correspondence with a correlated pixel, or a plurality of closely localized pixels, of the pixilated light-turning layer. Alternatively or additionally, the pixilated light-turning layer can be a holographic layer.

The method can also include causing a plurality of light sources to sequentially emit collimated light into the light guide, in which mapping the light sensor location includes determining which light source of the plurality of light sources emitted light scattered by the object.

The received light can be directed from the pixilated light-turning layer to the light sensor location via another light guide spaced apart from the light guide.

The method can also include receiving light directed from the pixilated light-turning layer at a second light sensor location; mapping the second light sensor location with a location of a second object above the light guide, in which the second light sensor location is correlated with a pixel of the pixilated light-turning layer that is not correlated with the first light sensor location; and determining a position of another touch event based on mapping the second light sensor location with the location of the second object, in which the touch event and the other touch event are simultaneous.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
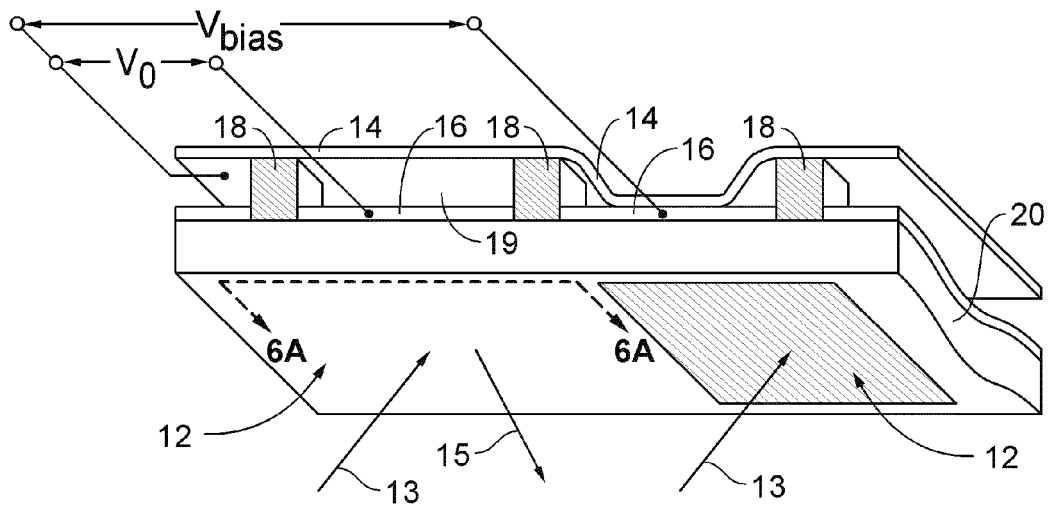
FIG. 1 shows an example of an isometric view depicting two adjacent pixels in a series of pixels of an interferometric modulator (IMOD) display device.

The following detailed description is directed to certain implementations for the purposes of describing the innovative aspects. However, the teachings herein can be applied in a multitude of different ways. The described implementations may be implemented in any device that is configured to display an image, whether in motion (e.g., video) or stationary (e.g., still image), and whether textual, graphical or pictorial. More particularly, it is contemplated that the implementations may be implemented in or associated with a variety of electronic devices such as, but not limited to, mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, GPS receivers/navigators, cameras, MP3 players, camcorders, game consoles, wrist watches, clocks, calculators, television monitors, flat panel displays, electronic reading devices (e.g., e-readers), computer monitors, auto displays (e.g., odometer display, etc.), cockpit controls and/or displays, camera view displays (e.g., display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (e.g., MEMS and non-MEMS), aesthetic structures (e.g., display of images on a piece of jewelry) and a variety of electromechanical systems devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes, and electronic test equipment. Thus, the teachings are not intended to be limited to the implementations depicted solely in the Figures, but instead have wide applicability as will be readily apparent to a person having ordinary skill in the art.

In some implementations, an optical touch screen apparatus is configured to determine the position of a touch event by selectively redirecting scattered light from a touch event to correlated locations on a light sensor. The light is scattered by an object causing the touch event. The touch screen apparatus can include a light guide having a major surface that forms the touch interface of the touch screen apparatus, a light source for injecting light into the light guide, a light sensor for detecting scattered injected light, and a pixilated light-turning layer for redirecting light to the light sensor. The pixilated light-turning layer includes light-turning features that form pixels. The light-turning layer can be a holographic layer in some implementations, and can be disposed facing the major surface, for example, directly under the light guide. A display can be provided under the light-turning layer. Each pixel of the light-turning layer can be configured to only redirect light to one or more particular, predefined "correlated" locations on the light receiving surface of the light sensor, without directing light to other locations.

In operation, according to some implementations, the light source can inject light into the light guide. When an object, such as a finger, touches a major surface of the light guide, light from the light source propagating through the light guide can be scattered. The light-turning layer is disposed directly under the object and receives the scattered light. Some of the scattered light can be directed to a correlated location on the light sensor by a pixel of the light-turning layer. The position of the touch event can be determined by a processor based on the particular sensor location receiving light redirected by the pixel. Because the locations of the pixels over the surface of the touch interface are fixed and known, and, in some implementations, using the assumption that the pixels predominantly redirect light that has been scattered downward, the location of the touch event is understood to be directly above the pixel receiving the scattered light, and the location of a touch event can be determined by determining which part of light receiving surface of the light sensor has received light. Thus, the receipt of light at a given location on the light sensor indicates that an object has contacted a particular area of the touch screen.

Particular implementations of the subject matter described in this disclosure can be implemented to realize one or more of the following potential advantages. Touch events can be accurately detected based on optical principles with a touch screen having a pixilated light-turning layer, such as a pixilated holographic layer. For example, in some implementations, the pixilated light-turning layer can reduce or prevent image degradation that can result from conventional touch screens that utilize electrodes. Because the touch screen can be disposed over a display, between a viewer and the display, the electrodes can cause optical artifacts. Obviating the electrodes may prevent these artifacts. In addition, the optical touch screen can be simpler to manufacture than electrode-based touch screens, since intricate electrode patterns do not need to be formed. In addition, the light guide for the touch screen may be integrated with a front light for the display in some implementations, thereby reducing the number of parts for the display system, which can have advantages for reducing manufacturing and parts costs, and also for reducing the thickness the display device.

An example of a suitable MEMS device, to which the described implementations may apply, is a reflective display device. Reflective display devices can incorporate interferometric modulators (IMODs) to selectively absorb and/or reflect light incident thereon using principles of optical interference. IMODs can include an absorber, a reflector that is movable with respect to the absorber, and an optical resonant cavity defined between the absorber and the reflector. The reflector can be moved to two or more different positions, which can change the size of the optical resonant cavity and thereby affect the reflectance of the interferometric modulator. The reflectance spectrums of IMODs can create fairly broad spectral bands which can be shifted across the visible wavelengths to generate different colors. The position of the spectral band can be adjusted by changing the thickness of the optical resonant cavity, i.e., by changing the position of the reflector.

FIG. 1 shows an example of an isometric view depicting two adjacent pixels in a series of pixels of an interferometric modulator (IMOD) display device. The IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, e.g., to a user. Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white.

The IMOD display device can include a row/column array of IMODs. Each IMOD can include a pair of reflective layers, i.e., a movable reflective layer and a fixed partially reflective layer, positioned at a variable and controllable distance from each other to form an air gap (also referred to as an optical gap or cavity). The movable reflective layer may be moved between at least two positions. In a first position, i.e., a relaxed position, the movable reflective layer can be positioned at a relatively large distance from the fixed partially reflective layer. In a second position, i.e., an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when actuated, reflecting light outside of the visible range (e.g., infrared light). In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted portion of the pixel array in FIG. 1 includes two adjacent interferometric modulators 12. In the IMOD 12 on the left (as illustrated), a movable reflective layer 14 is illustrated in a relaxed position at a predetermined distance from an optical stack 16, which includes a partially reflective layer. The voltage $V_0$ applied across the IMOD 12 on the left is insufficient to cause actuation of the movable reflective layer 14. In the IMOD 12 on the right, the movable reflective layer 14 is illustrated in an actuated position near or adjacent the optical stack 16. The voltage $V_{bias}$ applied across the IMOD 12 on the right is sufficient to maintain the movable reflective layer 14 in the actuated position.

In FIG. 1, the reflective properties of pixels 12 are generally illustrated with arrows indicating light 13 incident upon the pixels 12, and light 15 reflecting from the pixel 12 on the left. Although not illustrated in detail, it will be understood by a person having ordinary skill in the art that most of the light 13 incident upon the pixels 12 will be transmitted through the transparent substrate 20, toward the optical stack 16. A portion of the light incident upon the optical stack 16 will be transmitted through the partially reflective layer of the optical stack 16, and a portion will be reflected back through the transparent substrate 20. The portion of light 13 that is transmitted through the optical stack 16 will be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the pixel 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals, e.g., chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and conductor, while different, more conductive layers or portions (e.g., of the optical stack 16 or of other structures of the IMOD) can serve to bus signals between IMOD pixels. The optical stack 16 also can include one or more insulating or dielectric layers covering one or more conductive layers or a conductive/absorptive layer.

In some implementations, the layer(s) of the optical stack 16 can be patterned into parallel strips, and may form row electrodes in a display device as described further below. As will be understood by one having skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be on the order of 1-1000 um, while the gap 19 may be on the order of <10,000 Angstroms (Å).

In some implementations, each pixel of the IMOD, whether in the actuated or relaxed state, is essentially a capacitor formed by the fixed and moving reflective layers. When no voltage is applied, the movable reflective layer 14 remains in a mechanically relaxed state, as illustrated by the pixel 12 on the left in FIG. 1, with the gap 19 between the movable reflective layer 14 and optical stack 16. However, when a potential difference, e.g., voltage, is applied to at least one of a selected row and column, the capacitor formed at the intersection of the row and column electrodes at the corresponding pixel becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated pixel 12 on the right in FIG. 1. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
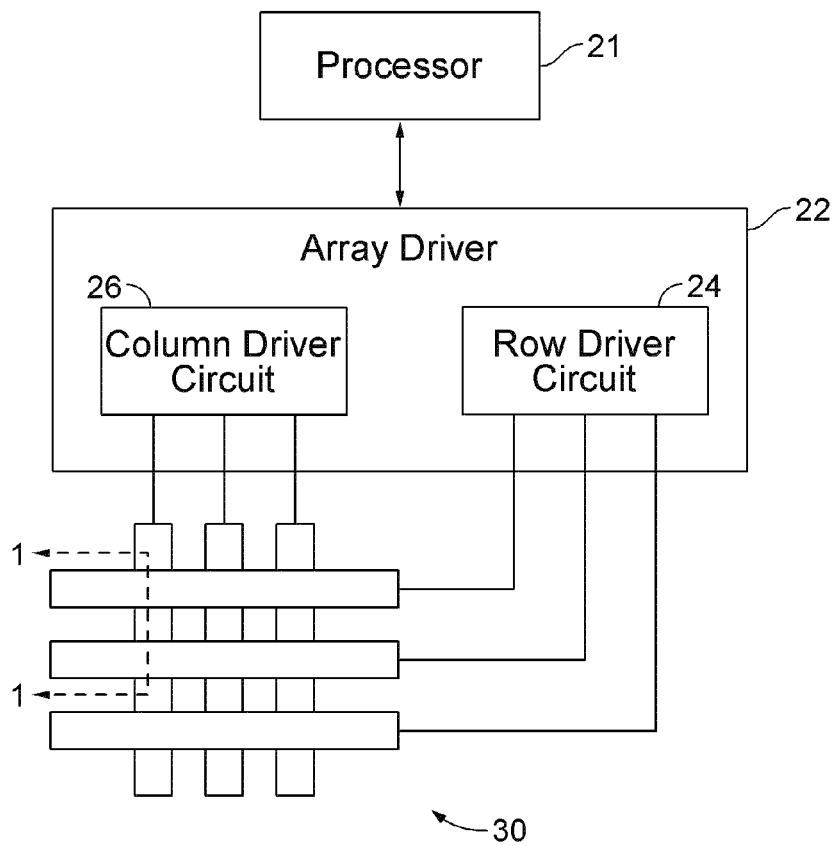
FIG. 2 shows an example of a system block diagram illustrating an electronic device incorporating a 3×3 interferometric modulator display.

FIG. 2 shows an example of a system block diagram illustrating an electronic device incorporating a 3×3 interferometric modulator display. The electronic device includes a processor 21 that may be configured to execute one or more software modules. In addition to executing an operating system, the processor 21 may be configured to execute one or more software applications, including a web browser, a telephone application, an email program, or any other software application.

The processor 21 can be configured to communicate with an array driver 22. The array driver 22 can include a row driver circuit 24 and a column driver circuit 26 that provide signals to, e.g., a display array or panel 30. The cross section of the IMOD display device illustrated in FIG. 1 is shown by the lines 1-1 in FIG. 2. Although FIG. 2 illustrates a 3×3 array of IMODs for the sake of clarity, the display array 30 may contain a very large number of IMODs, and may have a different number of IMODs in rows than in columns, and vice versa.

Figures 3, 4:
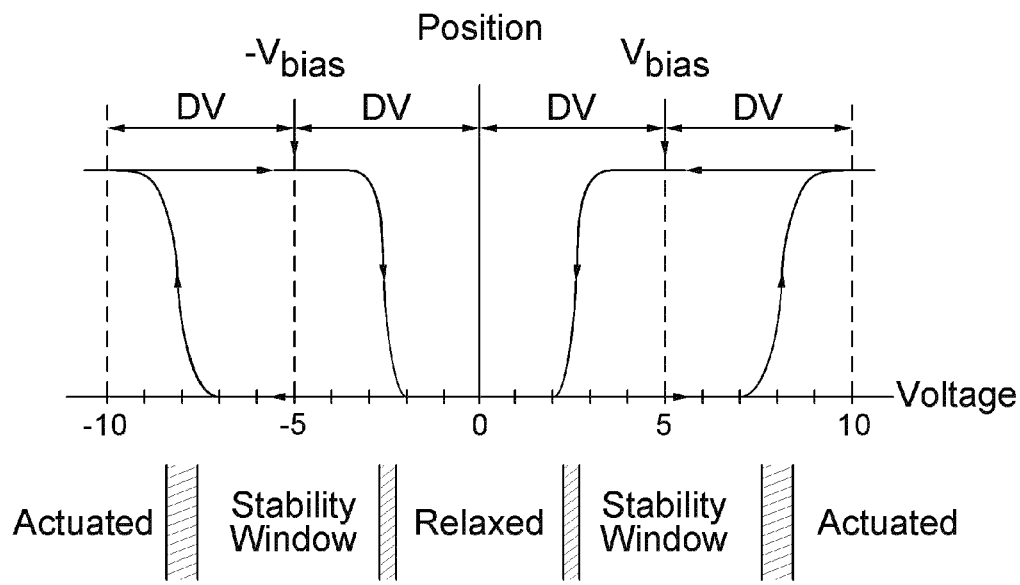
FIG. 3 shows an example of a diagram illustrating movable reflective layer position versus applied voltage for the interferometric modulator of FIG. 1.
FIG. 4 shows an example of a table illustrating various states of an interferometric modulator when various common and segment voltages are applied.

FIG. 3 shows an example of a diagram illustrating movable reflective layer position versus applied voltage for the interferometric modulator of FIG. 1. For MEMS interferometric modulators, the row/column (i.e., common/segment) write procedure may take advantage of a hysteresis property of these devices as illustrated in FIG. 3. An interferometric modulator may require, for example, about a 10-volt potential difference to cause the movable reflective layer, or mirror, to change from the relaxed state to the actuated state. When the voltage is reduced from that value, the movable reflective layer maintains its state as the voltage drops back below, e.g., 10-volts, however, the movable reflective layer does not relax completely until the voltage drops below 2-volts. Thus, a range of voltage, approximately 3 to 7-volts, as shown in FIG. 3, exists where there is a window of applied voltage within which the device is stable in either the relaxed or actuated state. This is referred to herein as the "hysteresis window" or "stability window." For a display array 30 having the hysteresis characteristics of FIG. 3, the row/column write procedure can be designed to address one or more rows at a time, such that during the addressing of a given row, pixels in the addressed row that are to be actuated are exposed to a voltage difference of about 10-volts, and pixels that are to be relaxed are exposed to a voltage difference of near zero volts. After addressing, the pixels are exposed to a steady state or bias voltage difference of approximately 5-volts such that they remain in the previous strobing state. In this example, after being addressed, each pixel sees a potential difference within the "stability window" of about 3-7-volts. This hysteresis property feature enables the pixel design, e.g., illustrated in FIG. 1, to remain stable in either an actuated or relaxed pre-existing state under the same applied voltage conditions. Since each IMOD pixel, whether in the actuated or relaxed state, is essentially a capacitor formed by the fixed and moving reflective layers, this stable state can be held at a steady voltage within the hysteresis window without substantially consuming or losing power. Moreover, essentially little or no current flows into the IMOD pixel if the applied voltage potential remains substantially fixed.

In some implementations, a frame of an image may be created by applying data signals in the form of "segment" voltages along the set of column electrodes, in accordance with the desired change (if any) to the state of the pixels in a given row. Each row of the array can be addressed in turn, such that the frame is written one row at a time. To write the desired data to the pixels in a first row, segment voltages corresponding to the desired state of the pixels in the first row can be applied on the column electrodes, and a first row pulse in the form of a specific "common" voltage or signal can be applied to the first row electrode. The set of segment voltages can then be changed to correspond to the desired change (if any) to the state of the pixels in the second row, and a second common voltage can be applied to the second row electrode. In some implementations, the pixels in the first row are unaffected by the change in the segment voltages applied along the column electrodes, and remain in the state they were set to during the first common voltage row pulse. This process may be repeated for the entire series of rows, or alternatively, columns, in a sequential fashion to produce the image frame. The frames can be refreshed and/or updated with new image data by continually repeating this process at some desired number of frames per second.

The combination of segment and common signals applied across each pixel (that is, the potential difference across each pixel) determines the resulting state of each pixel. FIG. 4 shows an example of a table illustrating various states of an interferometric modulator when various common and segment voltages are applied. As will be readily understood by one having ordinary skill in the art, the "segment" voltages can be applied to either the column electrodes or the row electrodes, and the "common" voltages can be applied to the other of the column electrodes or the row electrodes.

As illustrated in FIG. 4 (as well as in the timing diagram shown in FIG. 5B), when a release voltage $VC_{REL}$ is applied along a common line, all interferometric modulator elements along the common line will be placed in a relaxed state, alternatively referred to as a released or unactuated state, regardless of the voltage applied along the segment lines, i.e., high segment voltage $VS_H$ and low segment voltage $VS_L$. In particular, when the release voltage $VC_{REL}$ is applied along a common line, the potential voltage across the modulator (alternatively referred to as a pixel voltage) is within the relaxation window (see FIG. 3, also referred to as a release window) both when the high segment voltage $VS_H$ and the low segment voltage $VS_L$ are applied along the corresponding segment line for that pixel.

When a hold voltage is applied on a common line, such as a high hold voltage $VC_{HOLD\_H}$ or a low hold voltage $VC_{HOLD\_L}$, the state of the interferometric modulator will remain constant. For example, a relaxed IMOD will remain in a relaxed position, and an actuated IMOD will remain in an actuated position. The hold voltages can be selected such that the pixel voltage will remain within a stability window both when the high segment voltage $VS_H$ and the low segment voltage $VS_L$ are applied along the corresponding segment line. Thus, the segment voltage swing, i.e., the difference between the high $VS_H$ and low segment voltage $VS_L$, is less than the width of either the positive or the negative stability window.

When an addressing, or actuation, voltage is applied on a common line, such as a high addressing voltage $VC_{ADD\_H}$ or a low addressing voltage $VC_{ADD\_L}$, data can be selectively written to the modulators along that line by application of segment voltages along the respective segment lines. The segment voltages may be selected such that actuation is dependent upon the segment voltage applied. When an addressing voltage is applied along a common line, application of one segment voltage will result in a pixel voltage within a stability window, causing the pixel to remain unactuated. In contrast, application of the other segment voltage will result in a pixel voltage beyond the stability window, resulting in actuation of the pixel. The particular segment voltage which causes actuation can vary depending upon which addressing voltage is used. In some implementations, when the high addressing voltage $VC_{ADD\_H}$ is applied along the common line, application of the high segment voltage $VS_H$ can cause a modulator to remain in its current position, while application of the low segment voltage $VS_L$ can cause actuation of the modulator. As a corollary, the effect of the segment voltages can be the opposite when a low addressing voltage $VC_{ADD\_L}$ is applied, with high segment voltage $VS_H$ causing actuation of the modulator, and low segment voltage $VS_L$ having no effect (i.e., remaining stable) on the state of the modulator.

In some implementations, hold voltages, address voltages, and segment voltages may be used which always produce the same polarity potential difference across the modulators. In some other implementations, signals can be used which alternate the polarity of the potential difference of the modulators. Alternation of the polarity across the modulators (that is, alternation of the polarity of write procedures) may reduce or inhibit charge accumulation which could occur after repeated write operations of a single polarity.

Figure 5A:
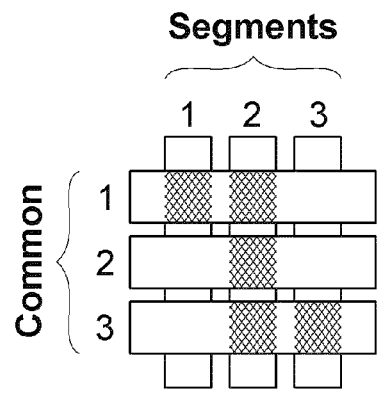
FIG. 5A shows an example of a diagram illustrating a frame of display data in the 3×3 interferometric modulator display of FIG. 2.
Figure 5B:
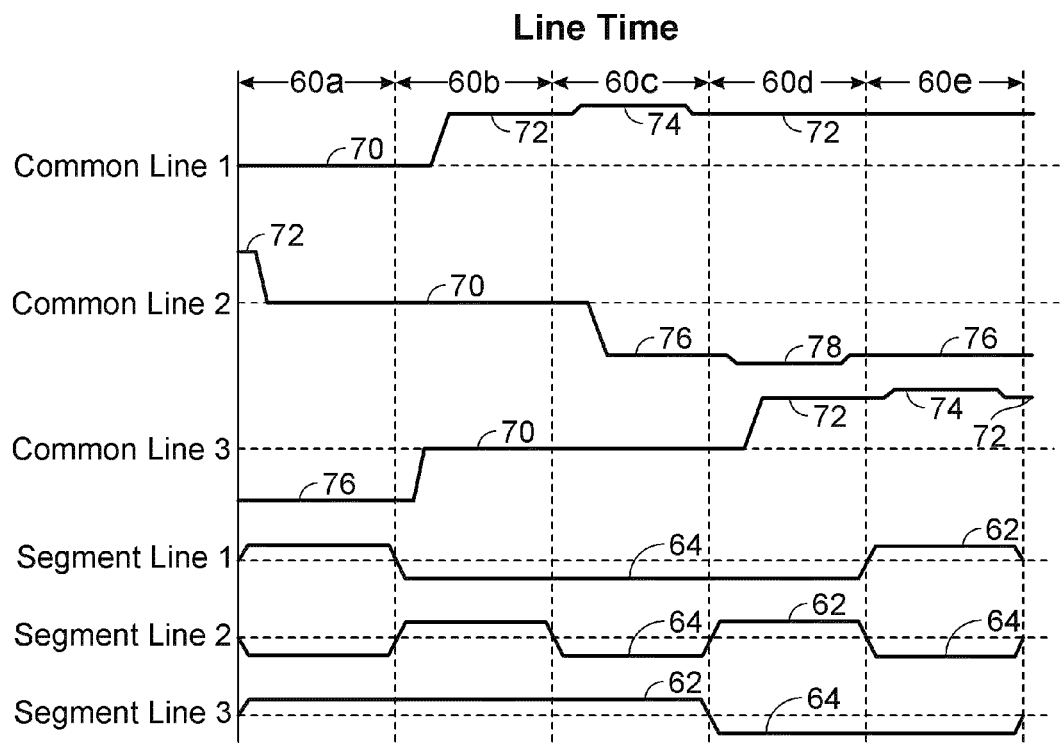
FIG. 5B shows an example of a timing diagram for common and segment signals that may be used to write the frame of display data illustrated in FIG. 5A.

FIG. 5A shows an example of a diagram illustrating a frame of display data in the 3×3 interferometric modulator display of FIG. 2. FIG. 5B shows an example of a timing diagram for common and segment signals that may be used to write the frame of display data illustrated in FIG. 5A. The signals can be applied to the, e.g., 3×3 array of FIG. 2, which will ultimately result in the line time 60e display arrangement illustrated in FIG. 5A. The actuated modulators in FIG. 5A are in a dark-state, i.e., where a substantial portion of the reflected light is outside of the visible spectrum so as to result in a dark appearance to, e.g., a viewer. Prior to writing the frame illustrated in FIG. 5A, the pixels can be in any state, but the write procedure illustrated in the timing diagram of FIG. 5B presumes that each modulator has been released and resides in an unactuated state before the first line time 60a.

During the first line time 60a: a release voltage 70 is applied on common line 1; the voltage applied on common line 2 begins at a high hold voltage 72 and moves to a release voltage 70; and a low hold voltage 76 is applied along common line 3. Thus, the modulators (common 1, segment 1), (1,2) and (1,3) along common line 1 remain in a relaxed, or unactuated, state for the duration of the first line time 60a, the modulators (2,1), (2,2) and (2,3) along common line 2 will move to a relaxed state, and the modulators (3,1), (3,2) and (3,3) along common line 3 will remain in their previous state. With reference to FIG. 4, the segment voltages applied along segment lines 1, 2 and 3 will have no effect on the state of the interferometric modulators, as none of common lines 1, 2 or 3 are being exposed to voltage levels causing actuation during line time 60a (i.e., $VC_{REL}$—relax and $VC_{HOLD\_L}$—stable).

During the second line time 60b, the voltage on common line 1 moves to a high hold voltage 72, and all modulators along common line 1 remain in a relaxed state regardless of the segment voltage applied because no addressing, or actuation, voltage was applied on the common line 1. The modulators along common line 2 remain in a relaxed state due to the application of the release voltage 70, and the modulators (3,1), (3,2) and (3,3) along common line 3 will relax when the voltage along common line 3 moves to a release voltage 70.

During the third line time 60c, common line 1 is addressed by applying a high address voltage 74 on common line 1. Because a low segment voltage 64 is applied along segment lines 1 and 2 during the application of this address voltage, the pixel voltage across modulators (1,1) and (1,2) is greater than the high end of the positive stability window (i.e., the voltage differential exceeded a predefined threshold) of the modulators, and the modulators (1,1) and (1,2) are actuated. Conversely, because a high segment voltage 62 is applied along segment line 3, the pixel voltage across modulator (1,3) is less than that of modulators (1,1) and (1,2), and remains within the positive stability window of the modulator; modulator (1,3) thus remains relaxed. Also during line time 60c, the voltage along common line 2 decreases to a low hold voltage 76, and the voltage along common line 3 remains at a release voltage 70, leaving the modulators along common lines 2 and 3 in a relaxed position.

During the fourth line time 60d, the voltage on common line 1 returns to a high hold voltage 72, leaving the modulators along common line 1 in their respective addressed states. The voltage on common line 2 is decreased to a low address voltage 78. Because a high segment voltage 62 is applied along segment line 2, the pixel voltage across modulator (2,2) is below the lower end of the negative stability window of the modulator, causing the modulator (2,2) to actuate. Conversely, because a low segment voltage 64 is applied along segment lines 1 and 3, the modulators (2,1) and (2,3) remain in a relaxed position. The voltage on common line 3 increases to a high hold voltage 72, leaving the modulators along common line 3 in a relaxed state.

Finally, during the fifth line time 60e, the voltage on common line 1 remains at high hold voltage 72, and the voltage on common line 2 remains at a low hold voltage 76, leaving the modulators along common lines 1 and 2 in their respective addressed states. The voltage on common line 3 increases to a high address voltage 74 to address the modulators along common line 3. As a low segment voltage 64 is applied on segment lines 2 and 3, the modulators (3,2) and (3,3) actuate, while the high segment voltage 62 applied along segment line 1 causes modulator (3,1) to remain in a relaxed position. Thus, at the end of the fifth line time 60e, the 3×3 pixel array is in the state shown in FIG. 5A, and will remain in that state as long as the hold voltages are applied along the common lines, regardless of variations in the segment voltage which may occur when modulators along other common lines (not shown) are being addressed.

In the timing diagram of FIG. 5B, a given write procedure (i.e., line times 60a-60e) can include the use of either high hold and address voltages, or low hold and address voltages. Once the write procedure has been completed for a given common line (and the common voltage is set to the hold voltage having the same polarity as the actuation voltage), the pixel voltage remains within a given stability window, and does not pass through the relaxation window until a release voltage is applied on that common line. Furthermore, as each modulator is released as part of the write procedure prior to addressing the modulator, the actuation time of a modulator, rather than the release time, may determine the necessary line time. Specifically, in implementations in which the release time of a modulator is greater than the actuation time, the release voltage may be applied for longer than a single line time, as depicted in FIG. 5B. In some other implementations, voltages applied along common lines or segment lines may vary to account for variations in the actuation and release voltages of different modulators, such as modulators of different colors.

Figure 6A:
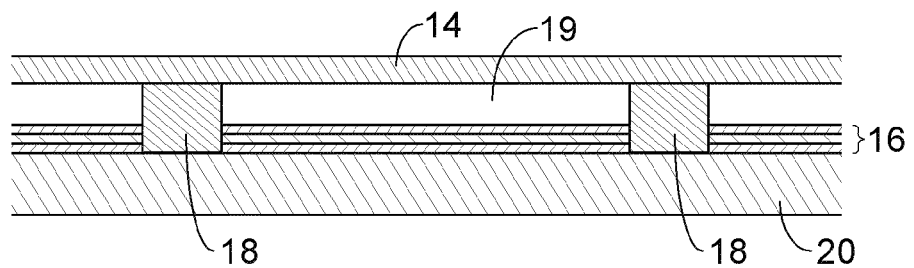
FIG. 6A shows an example of a partial cross-section of the interferometric modulator display of FIG. 1.
Figure 6B:
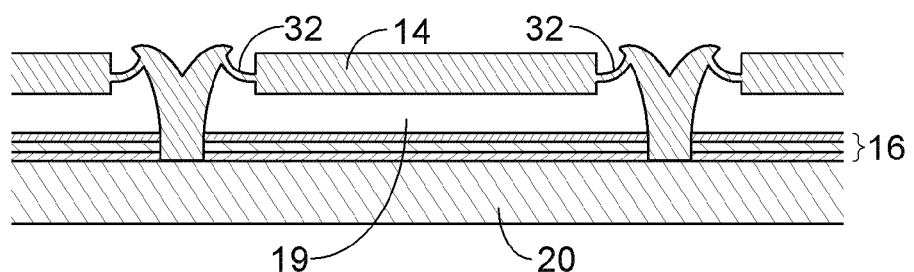
FIGS. 6B-6E show examples of cross-sections of varying implementations of interferometric modulators.
Figure 6C:
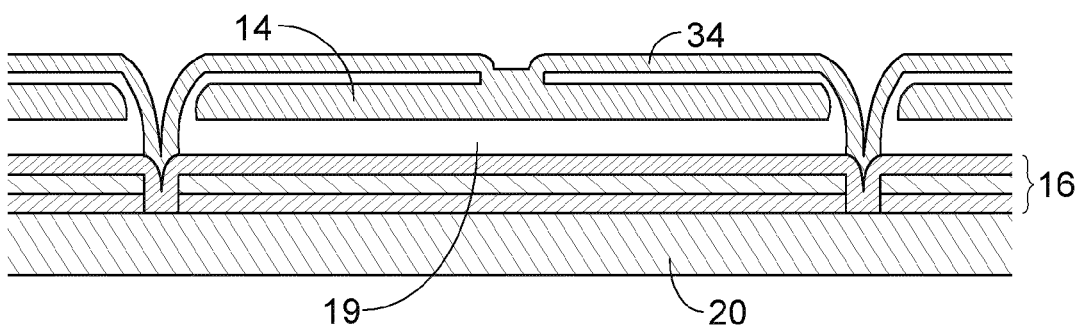

The details of the structure of interferometric modulators that operate in accordance with the principles set forth above may vary widely. For example, FIGS. 6A-6E show examples of cross-sections of varying implementations of interferometric modulators, including the movable reflective layer 14 and its supporting structures. FIG. 6A shows an example of a partial cross-section of the interferometric modulator display of FIG. 1, where a strip of metal material, i.e., the movable reflective layer 14 is deposited on supports 18 extending orthogonally from the substrate 20. In FIG. 6B, the movable reflective layer 14 of each IMOD is generally square or rectangular in shape and attached to supports at or near the corners, on tethers 32. In FIG. 6C, the movable reflective layer 14 is generally square or rectangular in shape and suspended from a deformable layer 34, which may include a flexible metal. The deformable layer 34 can connect, directly or indirectly, to the substrate 20 around the perimeter of the movable reflective layer 14. These connections are herein referred to as support posts. The implementation shown in FIG. 6C has additional benefits deriving from the decoupling of the optical functions of the movable reflective layer 14 from its mechanical functions, which are carried out by the deformable layer 34. This decoupling allows the structural design and materials used for the reflective layer 14 and those used for the deformable layer 34 to be optimized independently of one another.

Figure 6D:
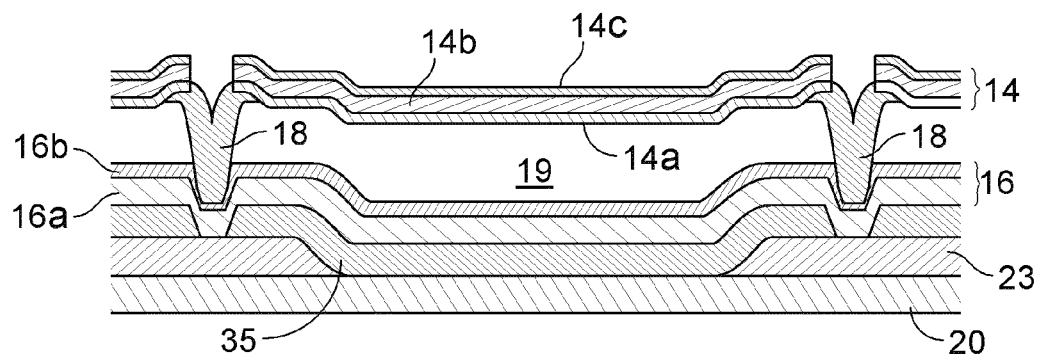

FIG. 6D shows another example of an IMOD, where the movable reflective layer 14 includes a reflective sub-layer 14a. The movable reflective layer 14 rests on a support structure, such as support posts 18. The support posts 18 provide separation of the movable reflective layer 14 from the lower stationary electrode (i.e., part of the optical stack 16 in the illustrated IMOD) so that a gap 19 is formed between the movable reflective layer 14 and the optical stack 16, for example when the movable reflective layer 14 is in a relaxed position. The movable reflective layer 14 also can include a conductive layer 14c, which may be configured to serve as an electrode, and a support layer 14b. In this example, the conductive layer 14c is disposed on one side of the support layer 14b, distal from the substrate 20, and the reflective sub-layer 14a is disposed on the other side of the support layer 14b, proximal to the substrate 20. In some implementations, the reflective sub-layer 14a can be conductive and can be disposed between the support layer 14b and the optical stack 16. The support layer 14b can include one or more layers of a dielectric material, for example, silicon oxynitride (SiON) or silicon dioxide ($SiO_2$). In some implementations, the support layer 14b can be a stack of layers, such as, for example, a $SiO_2$/SiON/$SiO_2$ tri-layer stack. Either or both of the reflective sub-layer 14a and the conductive layer 14c can include, e.g., an aluminum (Al) alloy with about 0.5% copper (Cu), or another reflective metallic material. Employing conductive layers 14a, 14c above and below the dielectric support layer 14b can balance stresses and provide enhanced conduction. In some implementations, the reflective sub-layer 14a and the conductive layer 14c can be formed of different materials for a variety of design purposes, such as achieving specific stress profiles within the movable reflective layer 14.

As illustrated in FIG. 6D, some implementations also can include a black mask structure 23. The black mask structure 23 can be formed in optically inactive regions (e.g., between pixels or under posts 18) to absorb ambient or stray light. The black mask structure 23 also can improve the optical properties of a display device by inhibiting light from being reflected from or transmitted through inactive portions of the display, thereby increasing the contrast ratio. Additionally, the black mask structure 23 can be conductive and be configured to function as an electrical bussing layer. In some implementations, the row electrodes can be connected to the black mask structure 23 to reduce the resistance of the connected row electrode. The black mask structure 23 can be formed using a variety of methods, including deposition and patterning techniques. The black mask structure 23 can include one or more layers. For example, in some implementations, the black mask structure 23 includes a molybdenum-chromium (MoCr) layer that serves as an optical absorber, a layer, and an aluminum alloy that serves as a reflector and a bussing layer, with a thickness in the range of about 30-80 Å, 500-1000 Å, and 500-6000 Å, respectively. The one or more layers can be patterned using a variety of techniques, including photolithography and dry etching, including, for example, carbon tetrafluoride ($CF_4$) and/or oxygen ($O_2$) for the MoCr and $SiO_2$ layers and chlorine ($Cl_2$) and/or boron trichloride ($BCl_3$) for the aluminum alloy layer. In some implementations, the black mask 23 can be an etalon or interferometric stack structure. In such interferometric stack black mask structures 23, the conductive absorbers can be used to transmit or bus signals between lower, stationary electrodes in the optical stack 16 of each row or column. In some implementations, a spacer layer 35 can serve to generally electrically isolate the absorber layer 16a from the conductive layers in the black mask 23.

Figure 6E:
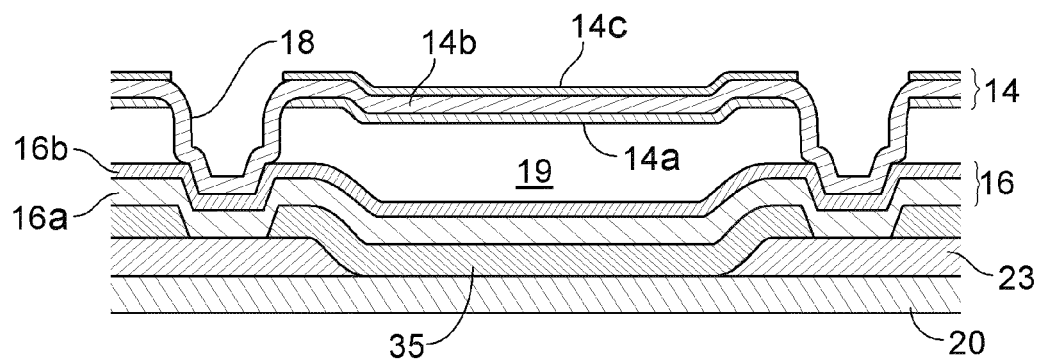

FIG. 6E shows another example of an IMOD, where the movable reflective layer 14 is self supporting. In contrast with FIG. 6D, the implementation of FIG. 6E does not include support posts 18. Instead, the movable reflective layer 14 contacts the underlying optical stack 16 at multiple locations, and the curvature of the movable reflective layer 14 provides sufficient support that the movable reflective layer 14 returns to the unactuated position of FIG. 6E when the voltage across the interferometric modulator is insufficient to cause actuation. The optical stack 16, which may contain a plurality of several different layers, is shown here for clarity including an optical absorber 16a, and a dielectric 16b. In some implementations, the optical absorber 16a may serve both as a fixed electrode and as a partially reflective layer.

In implementations such as those shown in FIGS. 6A-6E, the IMODs function as direct-view devices, in which images are viewed from the front side of the transparent substrate 20, i.e., the side opposite to that upon which the modulator is arranged. In these implementations, the back portions of the device (that is, any portion of the display device behind the movable reflective layer 14, including, for example, the deformable layer 34 illustrated in FIG. 6C) can be configured and operated upon without impacting or negatively affecting the image quality of the display device, because the reflective layer 14 optically shields those portions of the device. For example, in some implementations a bus structure (not illustrated) can be included behind the movable reflective layer 14 which provides the ability to separate the optical properties of the modulator from the electromechanical properties of the modulator, such as voltage addressing and the movements that result from such addressing. Additionally, the implementations of FIGS. 6A-6E can simplify processing, such as, e.g., patterning.

Figure 7:
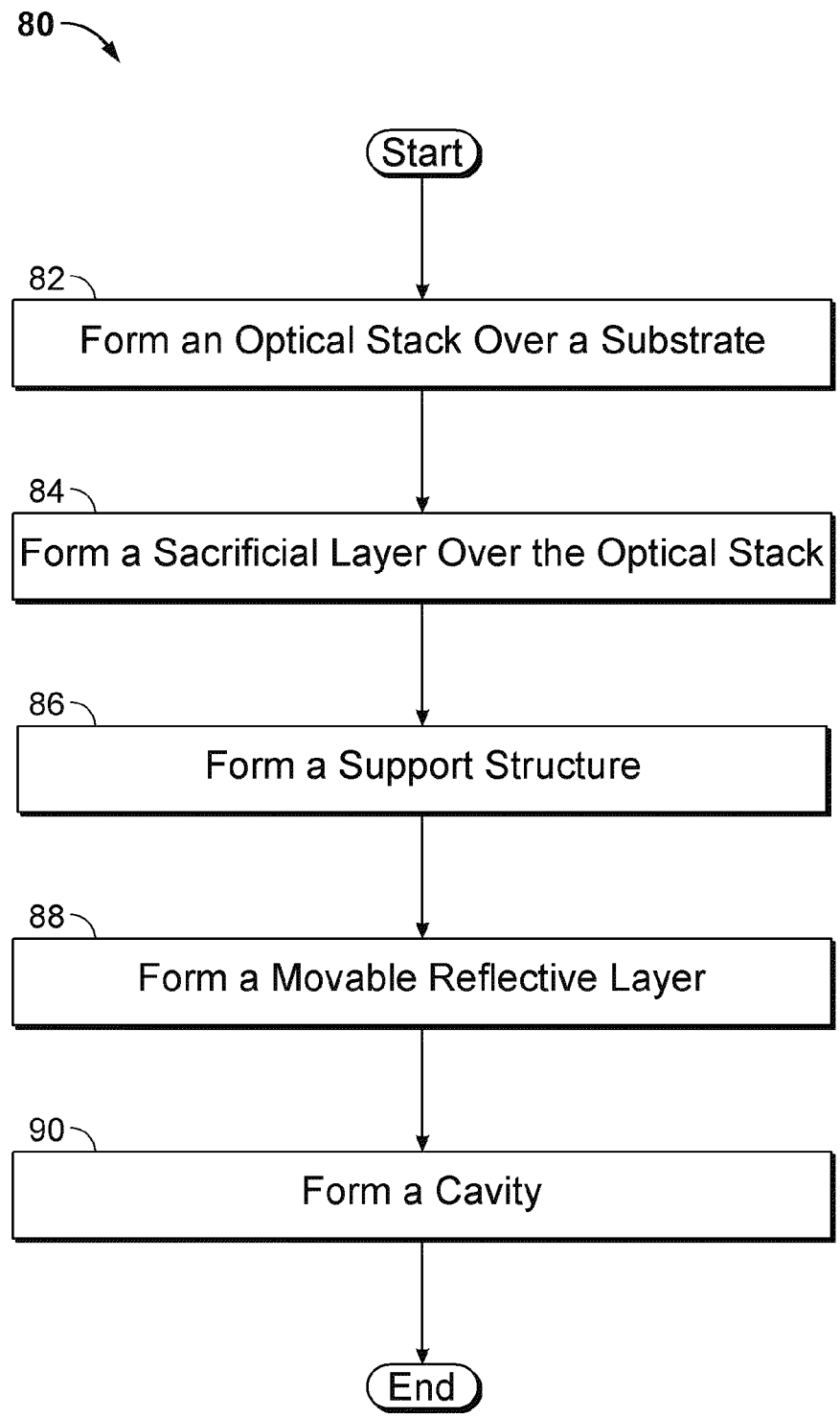
FIG. 7 shows an example of a flow diagram illustrating a manufacturing process for an interferometric modulator.
Figure 8A:
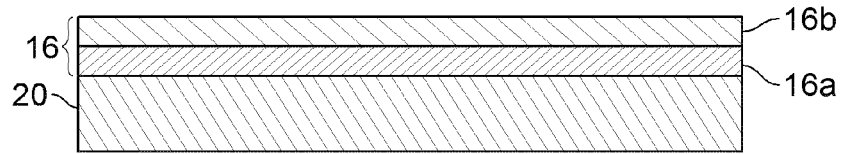
FIGS. 8A-8E show examples of cross-sectional schematic illustrations of various stages in a method of making an interferometric modulator.

FIG. 7 shows an example of a flow diagram illustrating a manufacturing process 80 for an interferometric modulator, and FIGS. 8A-8E show examples of cross-sectional schematic illustrations of corresponding stages of such a manufacturing process 80. In some implementations, the manufacturing process 80 can be implemented to manufacture, e.g., interferometric modulators of the general type illustrated in FIGS. 1 and 6, in addition to other blocks not shown in FIG. 7. With reference to FIGS. 1, 6 and 7, the process 80 begins at block 82 with the formation of the optical stack 16 over the substrate 20. FIG. 8A illustrates such an optical stack 16 formed over the substrate 20. The substrate 20 may be a transparent substrate such as glass or plastic, it may be flexible or relatively stiff and unbending, and may have been subjected to prior preparation processes, e.g., cleaning, to facilitate efficient formation of the optical stack 16. As discussed above, the optical stack 16 can be electrically conductive, partially transparent and partially reflective and may be fabricated, for example, by depositing one or more layers having the desired properties onto the transparent substrate 20. In FIG. 8A, the optical stack 16 includes a multilayer structure having sub-layers 16a and 16b, although more or fewer sub-layers may be included in some other implementations. In some implementations, one of the sub-layers 16a, 16b can be configured with both optically absorptive and conductive properties, such as the combined conductor/absorber sub-layer 16a. Additionally, one or more of the sub-layers 16a, 16b can be patterned into parallel strips, and may form row electrodes in a display device. Such patterning can be performed by a masking and etching process or another suitable process known in the art. In some implementations, one of the sub-layers 16a, 16b can be an insulating or dielectric layer, such as sub-layer 16b that is deposited over one or more metal layers (e.g., one or more reflective and/or conductive layers). In addition, the optical stack 16 can be patterned into individual and parallel strips that form the rows of the display.

Figure 8B:
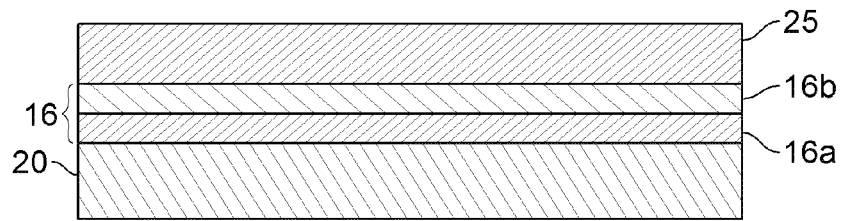

The process 80 continues at block 84 with the formation of a sacrificial layer 25 over the optical stack 16. The sacrificial layer 25 is later removed (e.g., at block 90) to form the cavity 19 and thus the sacrificial layer 25 is not shown in the resulting interferometric modulators 12 illustrated in FIG. 1. FIG. 8B illustrates a partially fabricated device including a sacrificial layer 25 formed over the optical stack 16. The formation of the sacrificial layer 25 over the optical stack 16 may include deposition of a xenon difluoride ($XeF_2$)-etchable material such as molybdenum (Mo) or amorphous silicon (a-Si), in a thickness selected to provide, after subsequent removal, a gap or cavity 19 (see also FIGS. 1 and 8E) having a desired design size. Deposition of the sacrificial material may be carried out using deposition techniques such as physical vapor deposition (PVD, e.g., sputtering), plasma-enhanced chemical vapor deposition (PECVD), thermal chemical vapor deposition (thermal CVD), or spin-coating.

Figure 8C:
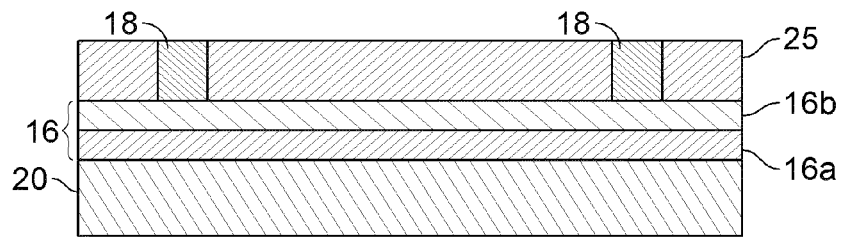

The process 80 continues at block 86 with the formation of a support structure e.g., a post 18 as illustrated in FIGS. 1, 6 and 8C. The formation of the post 18 may include patterning the sacrificial layer 25 to form a support structure aperture, then depositing a material (e.g., a polymer or an inorganic material, e.g., silicon oxide) into the aperture to form the post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the post 18 contacts the substrate 20 as illustrated in FIG. 6A. Alternatively, as depicted in FIG. 8C, the aperture formed in the sacrificial layer 25 can extend through the sacrificial layer 25, but not through the optical stack 16. For example, FIG. 8E illustrates the lower ends of the support posts 18 in contact with an upper surface of the optical stack 16. The post 18, or other support structures, may be formed by depositing a layer of support structure material over the sacrificial layer 25 and patterning portions of the support structure material located away from apertures in the sacrificial layer 25. The support structures may be located within the apertures, as illustrated in FIG. 8C, but also can, at least partially, extend over a portion of the sacrificial layer 25. As noted above, the patterning of the sacrificial layer 25 and/or the support posts 18 can be performed by a patterning and etching process, but also may be performed by alternative etching methods.

Figure 8D:
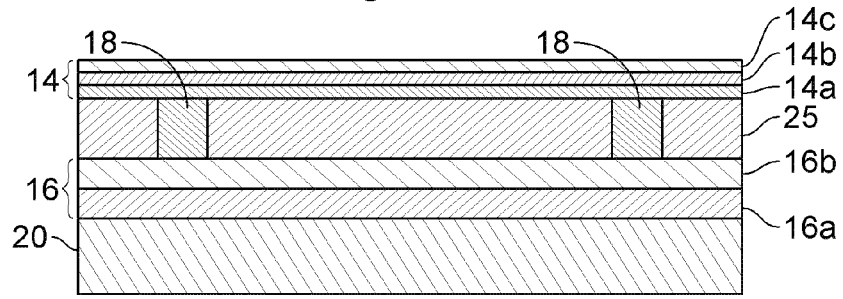
Figure 8E:
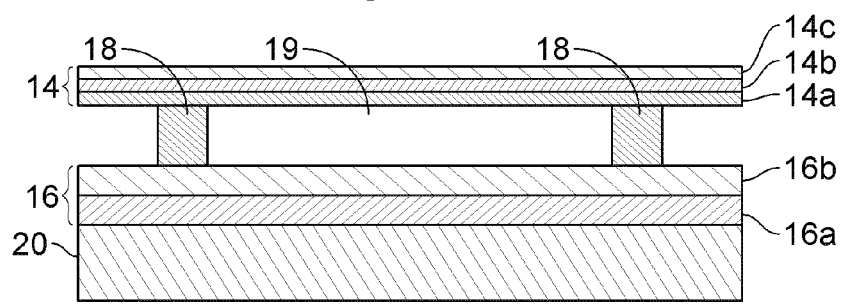

The process 80 continues at block 88 with the formation of a movable reflective layer or membrane such as the movable reflective layer 14 illustrated in FIGS. 1, 6 and 8D. The movable reflective layer 14 may be formed by employing one or more deposition steps, e.g., reflective layer (e.g., aluminum, aluminum alloy) deposition, along with one or more patterning, masking, and/or etching steps. The movable reflective layer 14 can be electrically conductive, and referred to as an electrically conductive layer. In some implementations, the movable reflective layer 14 may include a plurality of sub-layers 14a, 14b, 14c as shown in FIG. 8D. In some implementations, one or more of the sub-layers, such as sub-layers 14a, 14c, may include highly reflective sub-layers selected for their optical properties, and another sub-layer 14b may include a mechanical sub-layer selected for its mechanical properties. Since the sacrificial layer 25 is still present in the partially fabricated interferometric modulator formed at block 88, the movable reflective layer 14 is typically not movable at this stage. A partially fabricated IMOD that contains a sacrificial layer 25 may also be referred to herein as an "unreleased" IMOD. As described above in connection with FIG. 1, the movable reflective layer 14 can be patterned into individual and parallel strips that form the columns of the display.

The process 80 continues at block 90 with the formation of a cavity, e.g., cavity 19 as illustrated in FIGS. 1, 6 and 8E. The cavity 19 may be formed by exposing the sacrificial material 25 (deposited at block 84) to an etchant. For example, an etchable sacrificial material such as Mo or amorphous Si may be removed by dry chemical etching, e.g., by exposing the sacrificial layer 25 to a gaseous or vaporous etchant, such as vapors derived from solid $XeF_2$ for a period of time that is effective to remove the desired amount of material, typically selectively removed relative to the structures surrounding the cavity 19. Other etching methods, e.g. wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD may be referred to herein as a "released" IMOD.

Electronic devices, such as displays including interferometric modulators, can include touch screens to accept user inputs. In some implementations, the touch screen apparatus can be optically-based and detect light to determine the location of an object, for example, a user's finger, in contact with a touch input surface of the touch screen. Scattered light from the contacting object can be detected by a light sensor to determine the occurrence and location of a touch event. A light-turning layer may be used to direct the scattered light from the contacting object to the light sensor.

Figure 9A:
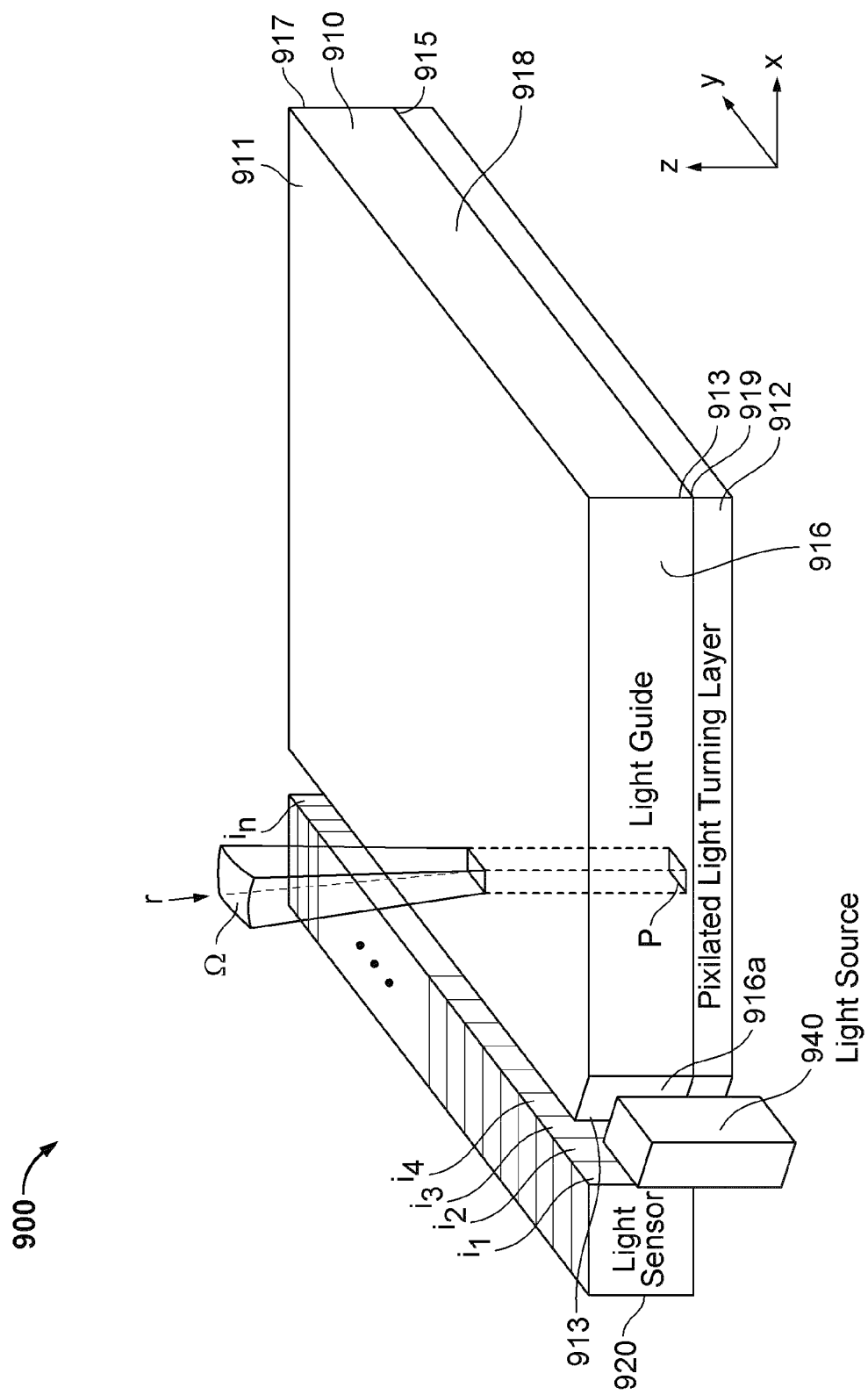
FIGS. 9A and 9B show examples of perspective views of a touch screen apparatus with a pixilated light-turning layer.
Figure 9B:
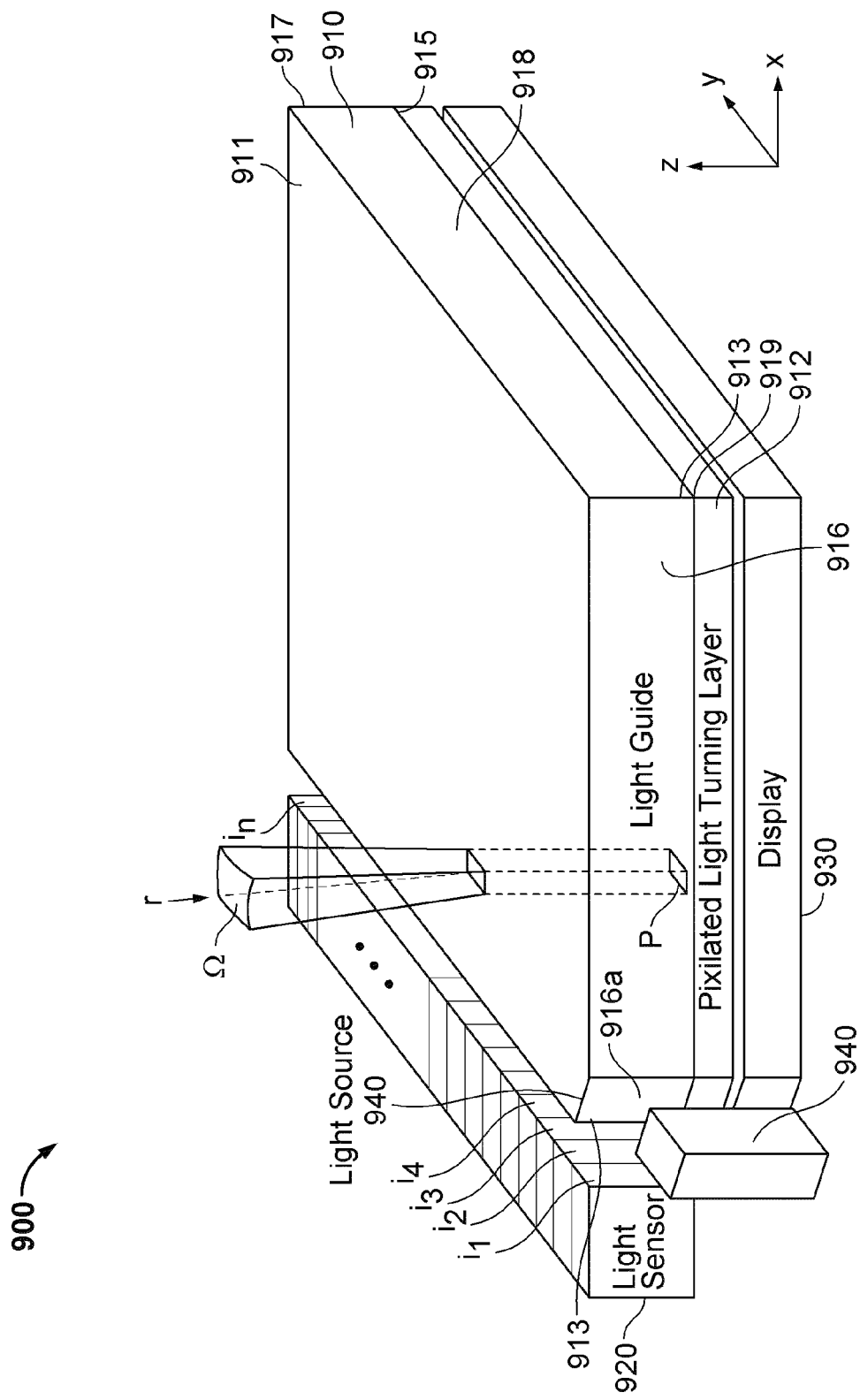

FIGS. 9A and 9B show examples of perspective views of a touch screen apparatus 900 with a pixilated light-turning layer, according to some implementations. The touch screen apparatus 900 can include a light guide 910, a light sensor 920, a light source 940, and a pixilated light-turning layer 912. In the implementation shown in FIG. 9B, the touch screen apparatus 900 can also include a display 930.

With reference to FIG. 9A, the light guide 910 can include a front major surface 911, which can function as a touch input surface for receiving contact with an object such as a user's finger. A back major surface 915 is opposite the front surface 911. At a corner of the light guide 910, a light input surface 916a may be provided for receiving light emitted by the light source 940. In some implementations, the light guide 910 can include two or more light input surfaces. The light guide 910 can also include a light-output surface 913 for providing light to the light sensor 920. While the light input and light output surfaces 918 and 913 are illustrated at edges of the light guide 910, in various implementations, it is possible for the light input and output surfaces to be disposed as portions of one or more of the front surface 911 or the back surface 915, or on one or more of the edges of the light guide disposed about the front 911 and back 915 surfaces (for example, edges 915, 916, 917, or 918). In some implementations, as illustrated, to reduce background noise, the light source 940 and light sensor 920 are not directly facing one another.

The light sensor 920 can be disposed along the light-output surface 913 of the light guide 910. In some implementations, the light sensor 920 may be a single light sensing device (for example, an image sensor such as a CMOS or CCD sensor) having a light receiving surface with an array of discrete light receiving locations. In some other implementations, the light sensor 920 can include a plurality of light sensing devices that are arrayed together.

In some implementations, the light sensor 920 may be capable of sensing light, including light at wavelengths outside of the visible spectrum, and the light source 940 can be configured to emit light of at least of those wavelengths. Suitable wavelengths include, without limitation, UV and infrared, as well as light of wavelengths within the visible range. As discussed herein, the light guide 910 may be provided with light-turning features forming pixels P that redirect incident light towards the light sensor 920. In some implementations where it is desirable to reduce interactions with visible light, such as where the touch screen apparatus 900 includes a display 930 (FIG. 9B), the light source 940 and light sensor 920 may be configured to emit and detect light at wavelengths outside the visible spectrum. This can reduce the impact of those pixels P on visible light (from a display) passing through the light guide 910 (to a viewer).

The light source 940 can include any element suitable to inject light into the light guide 910 at a suitable wavelength. The light source 940 may be a light emitting device such as, but not limited to, one or more light emitting diodes (LED), one or more incandescent bulbs, a light bar, one or more lasers, or any other form of light emitter. In some implementations, the light source 940 in one of a spaced-apart array of light emitters.

With continued reference to FIG. 9A, the pixilated light-turning layer 912 can include light-turning features formed onto and/or facing one of the major surfaces of the light guide 910, for example the back surface 915 of the light guide 910. The light-turning features are grouped into pixels P. Each pixel P is a region of the light turning layer 912 formed by one or more light turning features, each of which are configured to repeatably direct light to the same location, or the same set of locations, $i_t$ to $i_n$ on the light sensor 920. This location or set of locations $i_t$ to $i_n$ may be referred to as the pixel P's correlated location on the light sensor 920. Different pixels may each have different groups of light turning features that direct light to different correlated locations on the light sensor 920. In some implementations, there can be a one-to-one correspondence between pixels of the pixilated light-turning layer 912 and locations on the light receiving surface of the light sensor 920. In some implementations, the light-turning pixel P can occupy a rectangular area that may form a part of a grid of light-turning pixels. For instance, each pixel in the grid may be rectangular and/or square. In some implementations, each pixel can have dimensions of about 5 μm to about 5 mm by about 5 μm to about 5 mm. In some of these implementations, each pixel can have dimensions of about 50 μm to about 1 mm by about 50 μm to about 1 mm. As one example, each pixel can have dimensions of about 1 mm by about 1 mm. In other implementations, the pixels may have other shapes, such as circular, triangular, hexagonal, the like, or any combination thereof, as desired, depending upon the application or the manufacturing process. Pixels of the pixilated light-turning layer 912 may have different shapes and/or sizes from one another in some implementations.

The pixels P of the pixilated light-turning layer 912 may include holograms, diffraction gratings, microstructures, light-turning facets, or other optical features capable of acting upon light incident on the light-turning features within a range of incident angles and causing the incident light to be selectively redirected only toward a particular location or set of locations on the light sensor 920, without directing light to other locations on the light sensor 920. In some implementations, the light turning layer 912 is a holographic film and each light-turning pixel P may be a holographic pixel formed of holographic light turning features. The holographic light turning features may be part of a surface or volume hologram and the holographic pixels may be formed in or on a holographic film disposed on the back surface 915 of the light guide 910. In some implementations, the holographic film may be laminated onto the light guide 910. In some other implementations, the pixilated light-turning layer 912 may be integral to the light guide 910 and may be the portion of the light guide 910 in which pixels P are formed.

To reduce background noise and improve the precision of touch event detection, each light-turning pixel P may be configured to redirect only particular types of incident light. For example, with continued reference to FIG. 9A, each light-turning pixel P may only redirect light rays r incident upon that pixel within an acceptance cone Ω centered about a normal to the top surface 911. The larger the acceptance cone Ω, the more scattered light with different polar and azimuth angles of incidence can be redirected by the pixel P to its correlated location on the sensor 920. The acceptance cone Ω can be selected such that light scattered by an object in contact with the front surface 911 of the light guide 910 is accepted and light emitted by the light source 940 propagating through the light guide 910 that is not scattered by an object in contact with the front surface 911 of the light guide 910 is not accepted. In some implementations, the acceptance cone Ω for the light-turning pixel P include a range of angles of incident light, relative to a normal to the front surface 911, of less than about ±45°, less than about ±35°, less than about ±25°, less than about ±15°, less than about ±10°, or less than about ±5°. In some implementations, the acceptance cones Ω for each light-turning pixel P can each be approximately the same size. In some other implementations, pixels of the pixilated light-turning layer can have acceptance cones Ω of different sizes.

In addition to having limited acceptance cones Ω, in some implementations, as discussed herein, each light-turning pixel P may only redirect light rays r within a particular range of wavelengths. The light-turning pixel P can be configured to redirect only particular wavelengths of light within a range that corresponds to light emitted by the light source 940. In some implementations, the light redirected by light-turning pixel P may include wavelengths outside of the visible spectrum, such as UV or infrared light.

Some implementations of the touch screen apparatus 900 may include one or more processors (such as processor 21 of FIGS. 2 and 15B) in communication with the light sensor 920 and/or light source 940, and configured to map data corresponding to locations on the sensor 920 receiving light with a particular pixel and/or a particular position on the front surface 911. The one or more processors can be configured with specific executable instructions to determine the position where an object contacts the front surface 911. Given a known mapping of light-turning pixels P to locations on the light sensor 920 receiving light, the one or more processors may be configured to determine a position of a touch event.

Referring now to FIG. 9B, some implementations of the touch screen apparatus 900 may include a display 930 underlying the light guide 910. In some implementations, the display 930 is a reflective display. For example, the display 930 may be an interferometric modulator reflective display that includes display elements such as the interferometric modulators 12 (FIG. 1), arranged in an array 30 (FIG. 2). In some implementations with a reflective display underlying the light guide 910, the light guide 910 may form part of a front light for illuminating the reflective display 930. In such implementations, the light guide 910 may include light turning features that eject light out of the light guide 910, towards the display 930 to illuminate that display. The light to be ejected may be injected into the light guide 910 by light source 940. For example, the light source 940 may emit a broad range of wavelengths of light, including light within the visible spectrum for use in illuminating the display 930 and light outside the visible spectrum for use with the touch screen functionality discussed herein. In other implementations, the touch screen apparatus 900 may further include a separate light source (not shown) for use as a front light.

As discussed herein, the touch screen apparatus 900 may be implemented in various configurations with various arrangements of light sources and light sensors. Some of these configurations are discussed below with reference to FIGS. 10A-13. While not shown for ease of discussion and illustration, display 930 (FIG. 9B) may be provided underlying each of the touch screen structures illustrated in these figures.

Figure 10A:
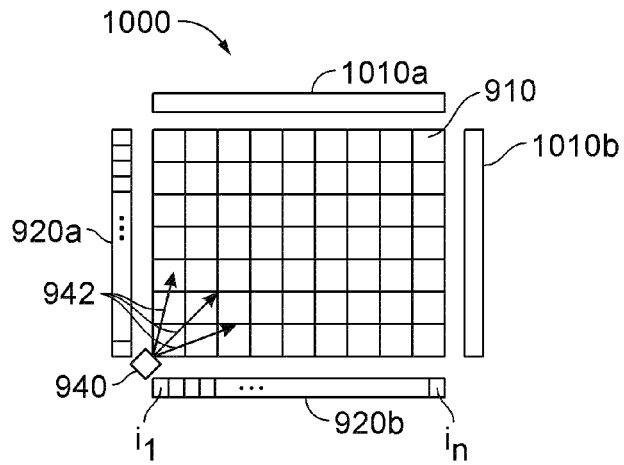
FIGS. 10A and 10B show examples of plan and side views of an implementation of a touch screen apparatus configured to detect the presence and location of a contacting object.
Figure 10B:
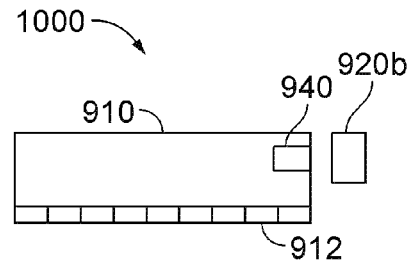

FIGS. 10A and 10B show examples of plan and side views of an implementation of a touch screen apparatus 1000 configured to detect the presence and location of a contacting object. The touch screen apparatus 1000 can include the light source 940, the light guide 910, the pixilated light-turning layer 912, and light absorbing structures 1010a and 1010b. For illustrative purposes, pixels of the light-turning layer 912 are illustrated in the plan view shown in FIG. 10A. As illustrated, two light sensors 920a and 920b are provided, each corresponding to the light sensor 920 of FIGS. 9A and 9B. Two light sensors 920a and 920b are positioned along different edges of the light guide 910. Directly across the light guide 910 from the light sensors 920a and 920b are the light absorbing structures 1010a and 1010b. The light absorbing structures 1010a and 1010b can be any structure suitable for absorbing light rays 942 from the light source 940 and/or preventing light rays 942 from being directed back into the light guide 910. Alternatively or additionally, the light absorbing structures 1010a and 1010b can be any structures suitable for absorbing ambient light injected into the light guide 910.

With continued reference to FIGS. 10A and 10B, the light source 940 can be disposed relative to the light guide 910 so as to inject light rays 942 into the light guide 910. Light rays 942 from the light source 940 are injected into the light guide 910 such that a portion of the light propagates in a direction across at least a portion of the light guide 120 at a low-graze angle relative to the major surfaces of the light guide 910 such that the light is reflected within the light guide 910 by total internal reflection ("TIR"). In this way, light rays 942 emitted from the light source 940 can propagate though the light guide 910. The light source 940 can be configured such that the light rays 942 in the light guide 910 are provided to substantially all of the front surface 911 of the light guide 910. In the example implementation illustrated in FIGS. 10A-D, the light source 940 can be positioned at a corner of the light guide 910. Such a placement of the light source 940 can evenly distribute light rays 942 though the light guide 910 and/or reduce flooding a particular area of the light guide 910 with light. In some other implementations, one or more light sources 940 can be interspersed between portions of the light sensor 920, on the same edge of the light guide 910 as the light sensor 920.

In some implementations, as discussed herein, the light source 940 can be configured so that the light rays 942 are sufficiently distinguishable from ambient and/or background light. For example, an infrared light emitting diode (LED) can be utilized to distinguish the light rays 942 and the redirected light from ambient visible light. In certain implementations, the light source 940 can be pulsed in a known manner to distinguish the light rays 942 from the background where infrared light is also present.

Figure 10C:
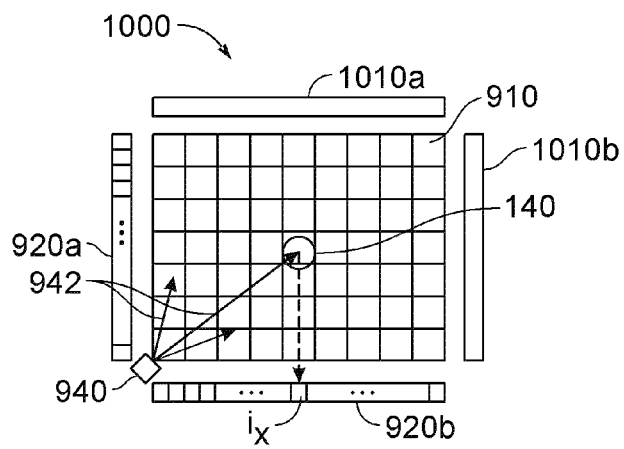
FIGS. 10C and 10D show examples of selected light rays scattered by an object contacting the touch screen of FIGS. 10A and 10B and redirected by a pixilated light-turning layer to a light sensor.
Figure 10D:
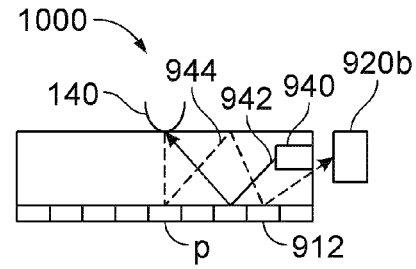

FIGS. 10C and 10D show examples of selected light rays scattered by an object 140 contacting the touch screen of FIGS. 10A and 10B and redirected by a pixilated light-turning layer to a light sensor. The object 140 can be, for example, a finger, a pen, a stylus, or the like. In some implementations, the light rays are scattered, in which light rays propagating through the light guide 910 are prevented from totally internally reflecting at the point of contact of the object 140 with the light guide 910. The light can strike the object 140 and be scattered or diffusely reflected by the object down to the light-turning layer 912. For example, as shown in FIGS. 10C and 10D, the object 140 can scatter one of the light rays 942 down to the pixilated light-turning layer 912, where it strikes pixel P, which redirects that light to that pixel P's correlated location on the sensor 920a or 920b. As illustrated, the correlated location is location $i_x$ on the sensor 920b.

Upon receiving the light input, the light sensor 920 can generate a signal indicative of light from the light source 940 scattered by the object 140 striking a particular light-receiving location of the light sensor 920. From the generated signal, a location of the touch event (i.e., the object 140 touching the front surface of the light guide 910) can be derived based on which pixel of the pixilated light-turning layer 912 corresponds to the sensor location receiving the scattered light. A processor (for example, the processor 21 of FIG. 2 and/or FIG. 15B) can be configured to determine a location of a touch event based on the signal indicative of the touch event generated by the light sensor 920. For instance, the processor can map a first position of light striking the light sensor 920 with a second position of the pixel P of the pixilated light-turning layer 912 directing the scattered light to the light sensor 920. This can indicate the position of the object 140 scattering light to the underlying pixel P.

Although the object 140 is shown above one pixel P for illustrative purposes, the object 140 can come into contact with the major surface of the light guide 910 over only a portion of one pixel or over two or more pixels. The touch screen apparatus described herein can determine a touch event based on signals generated in response to light striking more than one sensor location that correspond to more than one pixel of the pixilated light-turning layer 912. From these signals, a position of a touch event can be determined. For instance, a center position of the touch event can be derived from such signals indicating the receipt of scattered light by multiple pixels of the light-turning layer 912.

Figure 11A:
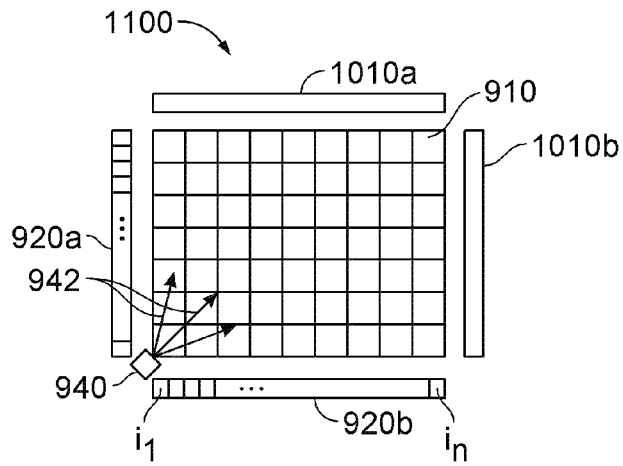
FIGS. 11A and 11B show examples of plan and side views of another implementation of a touch screen apparatus configured to detect the presence and location of a contacting object.
Figure 11B:
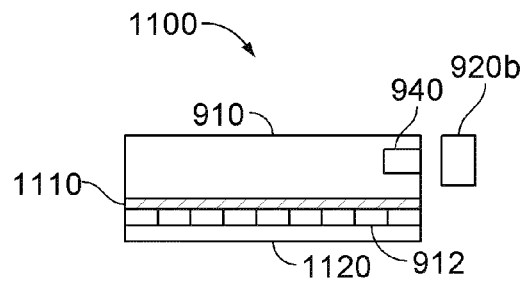

With reference now to FIGS. 11A and 11B, examples of plan and side views of another implementation of a touch screen apparatus 1100 configured to detect the presence and location of a contacting object is shown. The touch screen apparatus 1100 can be substantially the same as the touch screen apparatus 1000, except the touch screen apparatus 1100 can additionally include an optical decoupling layer 1110 and a second light guide 1120. The optical decoupling layer 1110 is between the light guide 910 and the second light guide 1120.

The optical decoupling layer 1110 is configured to optically decouple the second light guide 1120 from the overlying light guide 910. The pixilated light-turning layer 912 can be disposed between the optical decoupling layer 1110 and the light guide 1120. The optical decoupling layer 1110 can be formed of an optically transmissive material having a low refractive index relative to the refractive index of material of the light guide 910 and configured to promote TIR off the surface of the light guide 910 to which the optical decoupling layer 1110 is attached. For example, the refractive index of the material of the optical decoupling layer 1110 can be at least about 0.1 lower than the refractive index of material of the light guide 910. According to some implementations, the optical decoupling layer 1110 can be air or a solid state material.

Figure 11C:
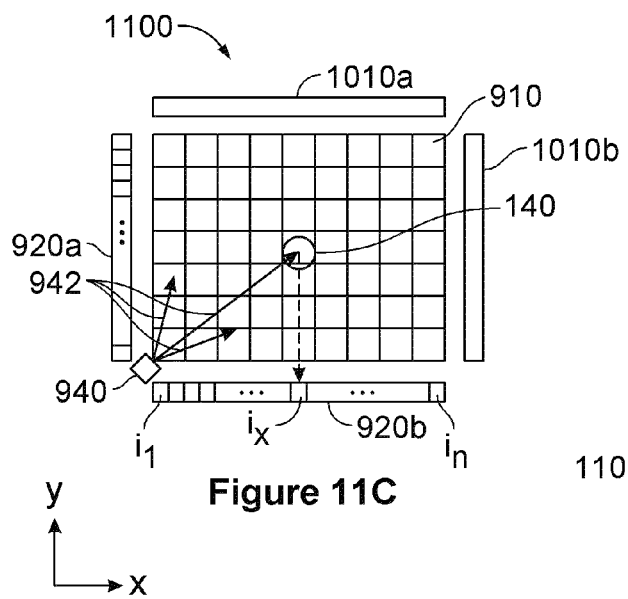
FIGS. 11C and 11D show examples of selected light rays scattered by an object contacting the touch screen of FIGS. 11A and 11B and redirected by a pixilated light-turning layer to a light sensor.
Figure 11D:
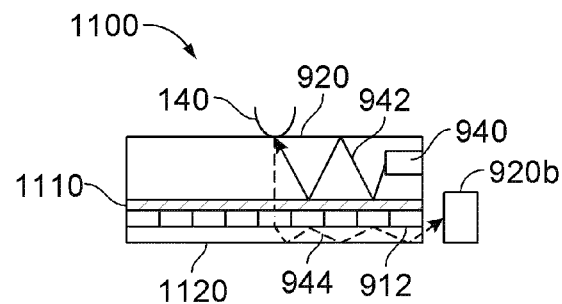

FIGS. 11C and 11D show examples of selected light rays scattered by the object 140 contacting the touch screen of FIGS. 11A and 11B and redirected by the pixilated light-turning layer 912 to the light sensor 920. Light rays 942 can propagate within the light guide 910 until being scattered by the object 140 touching the front surface 911 of the light guide 910. The optical decoupling layer 1110 prevents light incident at grazing angles from passing through it, but at least some of the scattered light from the object 140 is normal to a directly underlying portion of the optical decoupling layer 1110 and passes through that layer 1110. The light passing through the optical decoupling layer 1110 can strike a pixel P of the pixilated light-turning layer 912. The pixel P then redirects the light to its correlated location $i_x$ on the light sensor 920. The pixilated light-turning layer 912 is transmissive and light propagates, as shown by the dashed arrow 944, through the second light guide 1120 disposed below the pixilated light-turning layer 912 to reach the light sensor 920.

With continued reference to FIGS. 11A-11D, adding a second light guide 1120 below the pixilated light-turning layer 912 can, among other things, reduce noise detected by the light sensor 920 in some implementations. For example, light from the one or more light sources 940 can be kept propagating in the light guide 910 until it is scattered into the second light guide 1120. Because there may be less light propagating through the second light guide 1120, less noise may be detected by the light sensor 920. For example, light may not be present in the second light guide 1120 until light scattered by the object 140 enters the second light guide 1120.

Figure 12A:
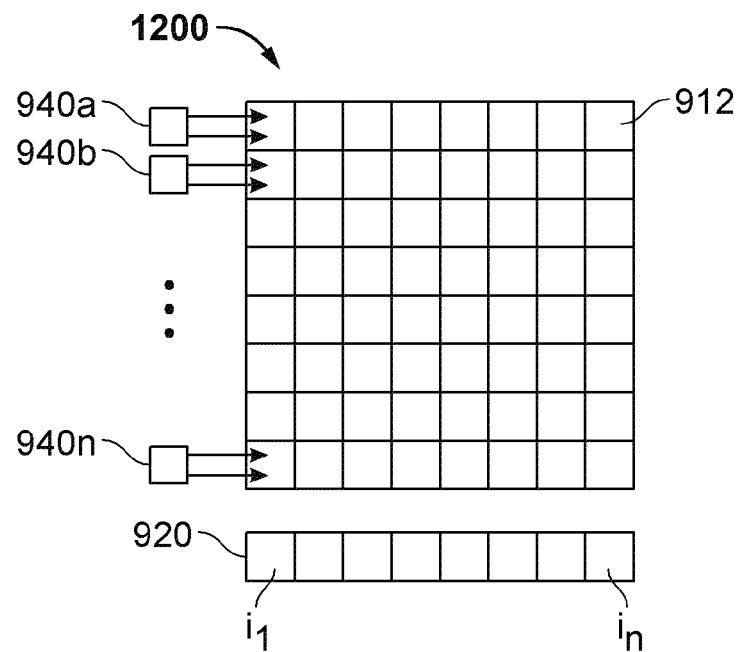
FIG. 12A shows an example of a plan view of another implementation of a touch screen apparatus configured to detect the presence and location of a contacting object.

FIG. 12A shows an example of a plan view of another implementation of a touch screen apparatus 1200 configured to detect the presence and location of the contacting object 140. The touch screen apparatus 1200 illustrated in FIG. 12A includes a light source that is formed by a plurality of discrete light emitters 940a to 940n that are configured to collimate light so that the light propagates through the light guide 910 substantially normal to the array of light sources 940a to 940n. In some implementations, one light emitter can be included for each row of pixels of the light-turning layer 912. Alternatively more or fewer light emitters 940a to 940n can be included for each row of pixels of the light-turning layer 912. The plurality of light sources 940a to 940n can be positioned, for example, along an input edge of the light guide 910. According to some implementations, the plurality of light sources 940a to 940n can sequentially pulse light into the input edge of the light guide 910 and pixels of the pixilated light-turning layer 912 can redirect scattered light associated with a touch event towards their correlated locations on the light sensor 920. Alternatively or additionally to pulsing light, the plurality of light sources 940a to 940n can be configured to emit light having two or more different wavelengths. Light associated with different light sources 940a to 940n can be differentiated at least in part by wavelength according to some implementations.

The touch screen apparatus 1200 can include a light sensor 920 along an edge of the light guide 910 transverse to the edge of the light guide 910 along which the plurality of light sources 940a to 940n are positioned. It will be understood that other arrangements of light sensor 920 can be utilized in other implementations. For instance, the light sensor 920 can be positioned along other edges of the light guide 910. In various implementations, the light sensor 920 can be positioned along two or more edges of the light guide 910. In some implementations, the light sensor 920 can include a line array of light receiving locations $i_t$ to $i_n$. Each location $i_t$ to $i_n$ can correspond to a column of pixels of the pixilated light-turning layer 912, according to some implementations.

The touch screen apparatus 1200 can include the various configurations of light guides 910 and/or 920 and the pixilated light-turning layers 912 of FIGS. 10B and/or 11B. For instance, the touch screen apparatus 1200 can include a single light guide 910 and a pixilated light-turning layer 912, for example, as shown in FIG. 10B. In other implementations, the touch screen apparatus 1200 can include two light guides 910 and 920, an optical decoupling layer 1110, and a pixilated light-turning layer 912, for example, as shown in FIG. 11B.

Figure 12B:
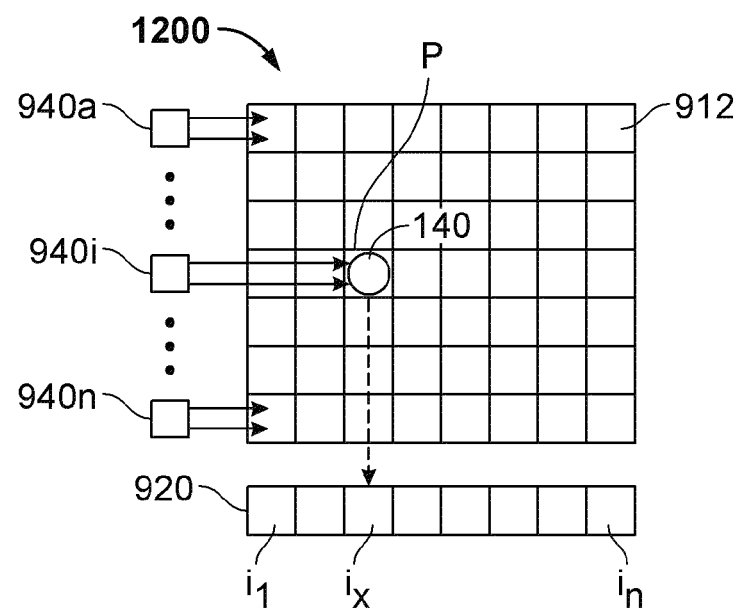
FIG. 12B shows examples of selected light rays scattered by an object contacting the touch screen of FIG. 12A and redirected by a pixel of a pixilated light-turning layer to a light sensor.

FIG. 12B shows an example of selected light rays scattered by an object 140 contacting the touch screen of FIG. 12A and redirected by pixel P of the pixilated light-turning layer 912 to correlated light receiving location $i_x$ on the light sensor 920. The location of a touch event can be determined based on which correlated location of the light sensor 920 detects light scattered by the object 140 and which light source 940a to 940n emits light corresponding to the touch event that is detected. For instance, which light source 940a to 940n is emitting light can be determined based on the timing of the touch event in implementations in which light sources 940a to 940n are configured to sequentially emit light. As another example, which light source 940a to 940n is emitting light can be determined based on the a wavelength of light striking a receiving surface of the light sensor 920 in implementations in which light sources 940a to 940n are configured to emit two or more different wavelengths of light. Knowledge of which of the light sources 940a to 940n emitted the scattered light (determined based on the pulse timing and/or light wavelength) can provide a coordinate along one axis and the correlated light receiving location of the sensor 920 receiving the light can provide a coordinate along an orthogonal axis, thereby allowing the location of the touch event to be determined.

Figure 12C:
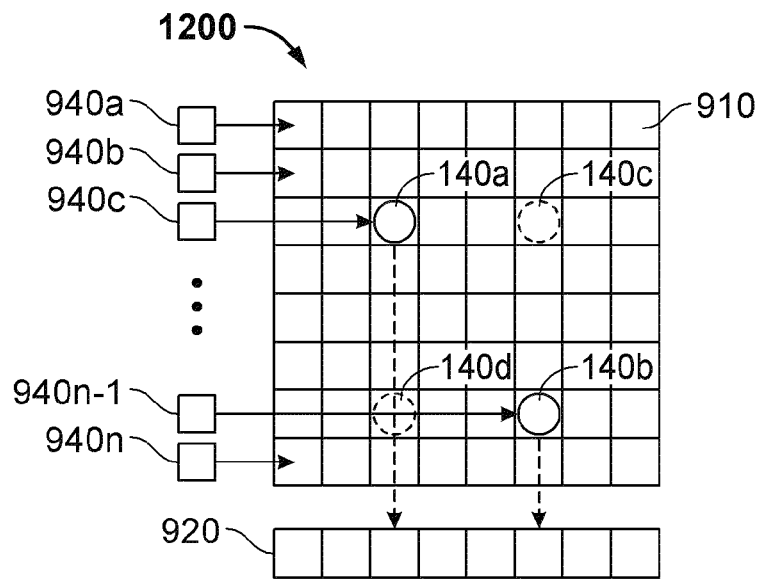
FIG. 12C shows examples of selected light rays scattered by two objects simultaneously contacting the touch screen of FIG. 12A and redirected by a pixel of a pixilated light-turning layer to a light sensor.

FIG. 12C shows an example of selected light rays scattered by two objects simultaneously contacting the touch screen of FIG. 12A and redirected by a pixilated light-turning layer to a light sensor. The touch screen apparatus 1200 can detect touch events corresponding to a first object 140a and a second object 140b simultaneously contacting a major surface of the light guide 910. The touch screen 1200 can distinguish the first object 140a and the second object 140b from hypothetical contact positions 140c and 140d. The touch screen apparatus 1200 can emit light from different light sources 940a to 940n at different times and/or at different wavelengths. One coordinate of the position of each touch can be determined based on the different times and/or different wavelengths. For instance, one light source 940a to 940n can emit light that is scattered by the first object 140a and a different light source 940a to 940n can emit light that is scattered by the second object 140b. The position of each of the simultaneous touch events can be determined based on the sensor location receiving light directed by each object and the time at which the light strikes the correlated locations on the light sensor 920 and/or the wavelength of the light striking the correlated locations on the light sensor 920.

Figure 12D:
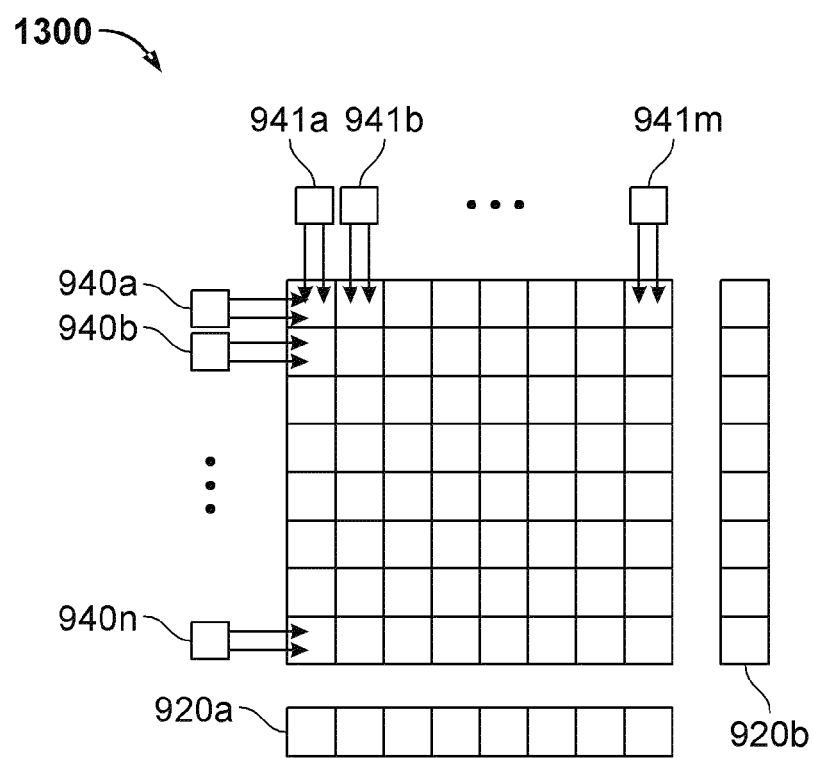
FIG. 12D shows an example of a plan view of another implementation of a touch screen apparatus configured to detect the presence and location of a contacting object.

FIG. 12D shows an example of a plan view of another implementation of a touch screen apparatus 1300 configured to detect the presence and location of a contacting object. In addition to the features of the touch screen apparatus 1200 of FIGS. 12A-12C, the touch screen apparatus 1300 of FIG. 12D can include a second plurality of light emitters 941a to 941m configured to provide collimated light such that the light propagates through the light guide 910 substantially normal to the second plurality of light emitters 941a to 941m. The second plurality of light emitters 941a to 941m can include any combination of features of the plurality of light emitters 940a to 940n, for example, as described in connection with FIGS. 12A-12C. The second plurality of light emitters 941a to 941m can be configured to emit light into a third edge of the light guide 910 that is different from the edge into which the plurality of light emitters 940a to 940n are configured to emit light into the light guide 910. In the implementation, illustrated in FIG. 12D, the edges of the light guide 910 into which the plurality of light emitters 940a to 940n and the second plurality of light emitters 941a to 941m are configured to emit light into are adjacent and orthogonal to each other.

With continued reference to FIG. 12D, the touch screen apparatus 1300 also includes light sensors 920a and 920b. The light sensor 920a can be positioned along an edge of the light guide 910 that is disposed on an axis transverse to the edge of the light guide 910 along which the plurality of light emitters 940a to 940n are positioned. The light sensor 920b can be positioned along an edge of the light guide 910 that is disposed on an axis transverse to the edge of the light guide 910 along which the second plurality of light emitters 941a to 941m are positioned.

According to some implementations, the plurality of light sources 940a to 940n and the second plurality of light sources 941a to 941m can sequentially pulse light into the input edge of the light guide 910 and pixels of the pixilated light-turning layer 912 can redirect scattered light associated with a touch event towards their correlated locations on the light sensor 920a and/or 920b. For example, the plurality of light sources 940a to 940n and the and the second plurality of light sources 941a to 941m can be configured to emit light at different times and the light sensors 920a and 920b can be configured to be inactive or to ignore received light when the light source facing it is emitting light. Alternatively or additionally to pulsing light, the plurality of light sources 940a to 940n and/or the second plurality of light sources 941a to 941m can be configured to emit light having two or more different wavelengths. In some implementations, the plurality of light sources 940a to 940n can sequentially pulse light and the second plurality of light sources 941a to 941m can emit light having two or more different wavelengths. Having two pluralities of light sources and two light sensors can increase the precision or resolution of the touch screen 1300 in some implementations by providing additional data points for determining the location of a touch event. In some implementations, the first plurality of light sources 940a to 940n can have a different number of light sources than the second plurality of light sources 941a to 941m. In some other implementations, n can equal m and the first plurality of light sources 940a to 940n can have the same number of light sources as the second plurality of light sources 941a to 941m.

The example touch screen apparatuses 1000, 1100, 1200, 1300 can alternatively or additionally use ambient light and/or light from a display (for example, the display 930 of FIG. 9B) in connection with detecting a touch event. For instance, ambient light and/or light from the display can be injected into the light guide 910. The light sensor 920 can be configured to detect the absence of ambient light associated with an object 140 touching or in close proximity to a major surface of the light guide 910. For example, the object 140 can block ambient light and the pixilated light-turning layer 912 can direct ambient light associated with pixels that are not blocked by the object 140 to the light sensor 920. The light sensor 920 can then generate one or more signals indicative of a sensor location that does not receive ambient light. A touch event associated with the object 140 can be determined based on the one or more generated signals.

Figure 13:
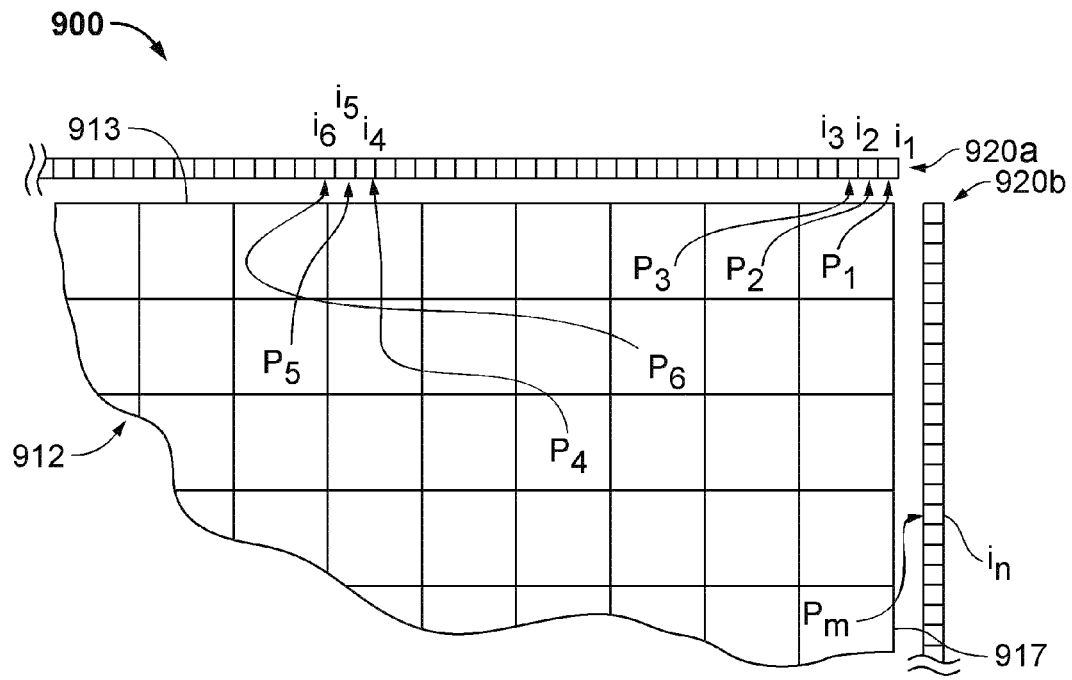
FIG. 13 shows an example of light-turning pixels correlated with locations on a light sensor.

FIG. 13 shows an example of light-turning pixels correlated with locations on a light sensor. In some implementations, as described herein, for an object contacting a light guide to be detected, light scattered by the object may be repeatably redirected only to one or more particular locations on an light sensor. To later determine a position of the object, a mapping of the two-dimensional location of the object to one or more specific locations on the light sensor may be utilized.

In the touch screen apparatus 900, 1000, 1100, 1200, and/or 1300, various predefined correlations of light-turning pixels to light receiving locations on the light sensor 920 can be used in detecting the position of a touch event. According to some implementations, predefined correlations of the light-turning pixels to light receiving locations can include one or more pixels having a similar sequence and/or relative spatial orientation to one another as the light receiving locations on the light sensor. Alternatively or additionally, as illustrated with pixels $P_4$-$P_6$ and light receiving locations $i_4$-$i_6$, in a predefined correlation of one or more light-turning pixels to light receiving locations on the light sensor may not match a relative location of one or more pixels in the light guide 910.

Referring to FIG. 13, a correlation between pixels and light receiving locations is illustrated by arrows from pixels $P_1$, $P_2$, $P_3$, ... $P_m$ to light receiving locations $i_1$, $i_2$, $i_3$, $i_n$ on the light sensor 920. In some implementations, there can be a one-to-one correspondence between a pixel of the light-turning layer and a light receiving location on the light sensor. In other implementations, more than one location on the light sensors 920a or 920b can correspond to a single pixel and/or more than one pixel can correspond to one location on the light sensor 920a or 920b. With more than one light receiving location mapped to a single pixel, a more accurate and/or precise determination of a position of a touch event can be detected in some implementations. With more than one pixel mapped to a single light receiving location, a smaller light sensor 920a or 920b can be used. A processor, such as the processor 21 of FIG. 15B, can be configured with specific executable instructions to correlate a sensor location with the location of the object based on a known correlation of sensor locations to pixels and/or locations above a light guide.

Figure 14:
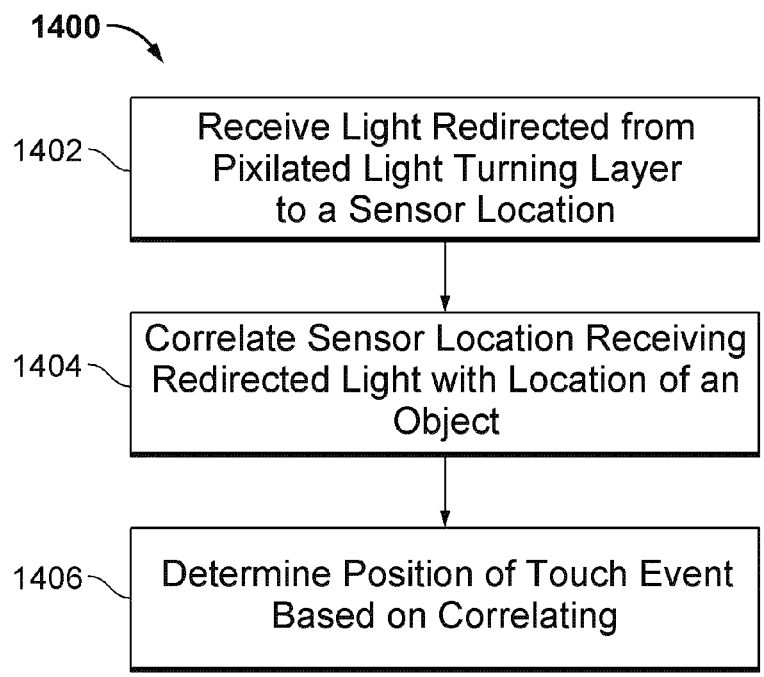
FIG. 14 shows an example of a flow diagram illustrating a process for determining a position of a touch event according to some implementations.

FIG. 14 shows an example of a flow diagram illustrating a process 1400 for determining a position of a touch event according to some implementations. Light redirected from a pixel of a pixilated light-turning layer to a sensor location can be received at block 1402. The pixilated light-turning layer can correspond to the light-turning layer 912 (FIGS. 9A-13) and the redirected light can propagate through light guide 910 (FIGS. 9A-13) and/or 1120 (FIGS. 11A-11D) to reach the light sensor 920 (FIGS. 9A-13).

The light receiving location receiving the incident light can be correlated with a location of the object at block 1404. The light receiving can be mapped to at least one pixel of the pixilated light-turning layer. According to certain implementations, the light receiving location can be mapped to a single pixel of the pixilated light-turning layer.

At block 1406, a position of the touch event can be determined based on the mapping. For instance, the mapping of the light receiving location to the at least one pixel of the pixilated light-turning layer can be used to determine the position of the touch event. The position of the touch event can be computed by any suitable processor in communication with the light sensor. In some implementations, the process 1400 can include causing a plurality of light sources to sequentially emit light into the light guide according to some implementations. In these implementations, the correlation can be based on which light source of the plurality of light sources emits light that is scattered by the object and received by the light sensor. For instance, one coordinate of a position of a touch event can be determined based on a time at which a location of the light sensor receives light. The time can be matched with when a particular light source emits light, which in turn indicates at least one coordinate of a position of the touch event. Another coordinate for the touch event can be determined from the light receiving location receiving light.

The process 1400 can detect the position of two or more simultaneous touch events. For example, light redirected from the pixilated light-turning layer can be received at a second sensor location. The second sensor location can be correlated with a location of a second object in contact with the light guide. For instance, the second sensor location can be mapped to at least one pixel of the pixilated light-turning layer that is not mapped to the first sensor location. A position of another touch event can be determined based on mapping the second sensor location with the location of the second object. In this way, positions of the touch event and the other touch event that occur simultaneously can be detected.

Figure 15A:
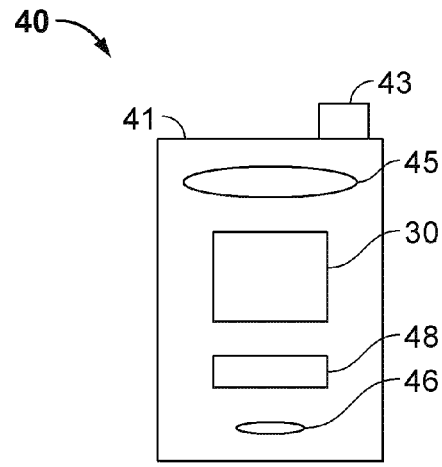
FIGS. 15A and 15B show examples of system block diagrams illustrating a display device that includes a plurality of interferometric modulators.
Figure 15B:
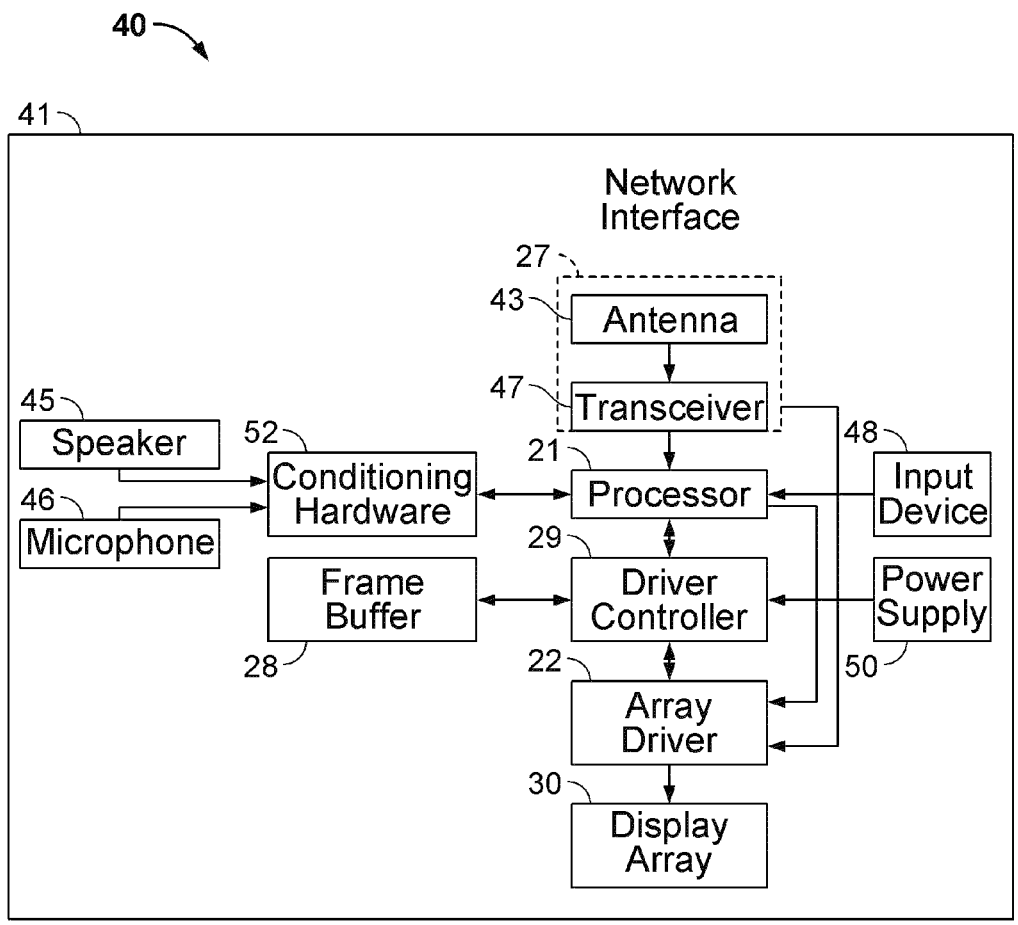

FIGS. 15A and 15B show examples of system block diagrams illustrating a display device 40 that includes a plurality of interferometric modulators. The display device 40 can be, for example, a cellular or mobile telephone. However, the same components of the display device 40 or slight variations thereof are also illustrative of various types of display devices such as televisions, e-readers and portable media players.

The display device 40 includes a housing 41, a display 30, an antenna 43, a speaker 45, an input device 48, and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber, and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an interferometric modulator display, as described herein.

The components of the display device 40 are schematically illustrated in FIG. 15B. The display device 40 includes a housing 41 and can include additional components at least partially enclosed therein. For example, the display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 can provide power to all components as required by the particular display device 40 design.

The network interface 27 includes the antenna 43 and the transceiver 47 so that the display device 40 can communicate with one or more devices over a network. The network interface 27 also may have some processing capabilities to relieve, e.g., data processing requirements of the processor 21. The antenna 43 can transmit and receive signals. In some implementations, the antenna 43 transmits and receives RF signals according to the IEEE 16.11 standard, including IEEE 16.11 (a), (b), or (g), or the IEEE 802.11 standard, including IEEE 802.11a, b, g or n. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), NEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation, and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller or a bi-stable display controller (e.g., an IMOD controller). Additionally, the array driver 22 can be a conventional driver or a bi-stable display driver (e.g., an IMOD display driver). Moreover, the display array 30 can be a conventional display array or a bi-stable display array (e.g., a display including an array of IMODs). In some implementations, the driver controller 29 can be integrated with the array driver 22. Such an implementation is common in highly integrated systems such as cellular phones, watches and other small-area displays.

In some implementations, the input device 48 can be configured to allow, e.g., a user to control the operation of the display device 40. The input device 48 can include a keypad, such as a QWERTY keyboard or a telephone keypad, a button, a switch, a rocker, a touch-sensitive screen, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices as are well known in the art. For example, the power supply 50 can be a rechargeable battery, such as a nickel-cadmium battery or a lithium-ion battery. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of detecting touch events on a touch screen, the method comprising:

receiving light directed from a pixilated light-turning layer at a light sensor location on a light sensor, the pixilated light-turning layer including pixels configured to redirect at least a portion of incident light scattered by an object above a light guide to the light sensor location;

mapping the light sensor location receiving the incident light with a location of the object, wherein the light sensor location is correlated with at least one single pixel of the pixilated light-turning layer;

determining a position of a touch event based on mapping the light sensor location with the location of the object;

receiving light directed from the pixilated light-turning layer at a second light sensor location;

mapping the second light sensor location with a location of a second object above the light guide, wherein the second light sensor location is correlated with a pixel of the pixilated light-turning layer that is not correlated with the first light sensor location; and determining a position of another touch event based on mapping the second light sensor location with the location of the second object, wherein the touch event and the other touch event are simultaneous.

2. The method of claim 1, wherein mapping the light sensor location comprises performing a one-to-one mapping of the light sensor location to a correlated pixel of the pixilated light-turning layer.

3. The method of claim 1, wherein receiving comprises receiving light directed from a holographic layer.

4. The method of claim 1, further comprising causing a plurality of light sources to sequentially emit collimated light into the light guide, wherein mapping the light sensor location includes determining which light source of the plurality of light sources emitted light scattered by the object.

5. The method of claim 1, wherein the received light is directed from the pixilated light-turning layer to the light sensor location via another light guide spaced apart from the light guide.

* * * * *